US012634914B1

(12) United States Patent
Yi et al.

(10) Patent No.: US 12,634,914 B1
(45) Date of Patent: May 19, 2026

(54) METHODS FOR FORWARDING DATA IN A WIRELESS COMMUNICATION NETWORK USING A WIRELESS REPEATER

(71) Applicant: Cable Television Laboratories, Inc., Louisville, CO (US)

(72) Inventors: Yunjung Yi, Vienna, VA (US); Dorin Gheorghe Viorel, Erie, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 487 days.

(21) Appl. No.: 18/301,175

(22) Filed: Apr. 14, 2023

Related U.S. Application Data

(60) Provisional application No. 63/336,756, filed on Apr. 29, 2022, provisional application No. 63/331,055, filed on Apr. 14, 2022.

(51) Int. Cl.
*H04W 72/044* (2023.01)
*H04W 84/04* (2009.01)

(52) U.S. Cl.
CPC ........ *H04W 72/046* (2013.01); *H04W 84/047* (2013.01)

(58) Field of Classification Search
CPC . H04W 72/046; H04W 84/047; H04W 16/28; H04W 16/26; H04W 84/22; H04W 88/04; H04B 7/0695; H04B 7/088
See application file for complete search history.

(56) References Cited

U.S. PATENT DOCUMENTS

| | | | | |
|---|---|---|---|---|
| 11,838,151 | B1 * | 12/2023 | Jones ................... | H04L 25/0224 |
| 2021/0345386 | A1 * | 11/2021 | Jiang ..................... | H04L 5/0053 |
| 2022/0286868 | A1 * | 9/2022 | Kim ...................... | H04L 1/0075 |
| 2023/0170962 | A1 * | 6/2023 | Ali ........................ | H04B 7/0626 |
| | | | | 370/252 |
| 2023/0189253 | A1 * | 6/2023 | Kim ...................... | H04L 5/0007 |
| | | | | 370/329 |
| 2024/0015755 | A1 * | 1/2024 | Pan ........................ | H04W 72/25 |
| 2024/0049197 | A1 * | 2/2024 | MolavianJazi .... | H04B 7/15528 |
| 2024/0056208 | A1 * | 2/2024 | Abedini ................... | H04B 7/01 |

OTHER PUBLICATIONS

3GPP TSG RAN Meeting #94e, Electronic Meeting, Dec. 6-17, 2021; RP-213700 (2021).
ETSI TS 138 211 V15.10.0 (Jan. 2022) 5G; NR; Physical channels and modulation.
ETSI TS 138 213 V15.15.0 (Jul. 2022) 5G; NR; Physical layer procedures for control.
ETSI TS 138 331 V15.21.0 (Apr. 2023) 5G; NR; Radio Resource Control (RRC); Protocol specification.

* cited by examiner

*Primary Examiner* — Mewale A Ambaye
(74) *Attorney, Agent, or Firm* — PdZ Patent Law, PLLC

(57) ABSTRACT

A method operable by a wireless repeater in a wireless communication network includes receiving, from a wireless base station, configuration parameters including at least (1) first wireless communication beam information specifying operation of the wireless repeater with respect to one or more first time resources, where the one or more first time resources overlap with one or more first synchronization signal block (SSB) resources of the wireless base station, and (2) second wireless communication beam information specifying operation of the wireless repeater with respect to one or more second time resources, where the one or more second time resources overlap with one or more second SSB resources of the wireless base station.

17 Claims, 23 Drawing Sheets

METHODS FOR FORWARDING DATA IN A WIRELESS COMMUNICATION NETWORK USING A WIRELESS REPEATER

CROSS REFERENCE TO RELATED APPLICATIONS

This application claims the benefit of priority to (a) U.S. Provisional Patent Application No. 63/331,055, filed on Apr. 14, 2022, and (b) U.S. Provisional Patent Application No. 63/336,756, filed on Apr. 29, 2022. Each of the aforementioned patent applications is incorporated herein by reference.

BACKGROUND

A wireless repeater is a device which receives wireless communication data and forwards the wireless communication data to one or more other nodes, optionally in accordance with side control information provided to the wireless repeater. Accordingly, a wireless repeater may extend the range of a wireless base station, such as a Third Generation Partnership (3GPP) wireless base station, e.g., an eNodeB or a gNodeB. A wireless repeater is different from an Integrated Access and Backhaul (IAB) device at least in that a wireless repeater does not process wireless communication data (e.g., decode wireless communication data) that it receives before forwarding/repeating the wireless communication data to another node, while an IAB device processes wireless communication data (e.g., decodes the wireless communication data, or produces new wireless communication data based on the received wireless communication data and encodes new wireless communication data) that it receives before forwarding the wireless communication data to another node. Accordingly, a wireless repeater forwards wireless communication data to another node essentially immediately after it receives the wireless communication data, while an IAB device requires time to process wireless communication data that it receives before forwarding the wireless communication data to another node.

During RANP #95, a study on new radio (NR) network-controlled repeaters (RP-212700) has been agreed on. A wireless repeater may be used for extending network coverage in a cost effective manner, where the repeater is basically performing receive-amplify and forward operation with potential side control information.

DETAILED DESCRIPTION OF THE EMBODIMENTS

Conventionally, a wireless repeater, sometimes alternately referred to as a radio frequency (RF) repeater or a relay, may receive a signal, amplify the signal, and transmit the signal. For example, when a signal is received via a transmit (TX) or a received (RX) beam pattern #1, the wireless repeater may transmit the signal via TX beam pattern #K. When the wireless repeater receives a second signal via TX or RX beam pattern #2, the wireless repeater may transmit the second signal via TX beam pattern #K. Irrespective of a designated user or transmitted beam from a donor node (e.g., a wireless base station) of a signal, the wireless repeater may simply amplify and transmit the signal based on a semi-statically configured antenna/radio configuration.

Figure 21:
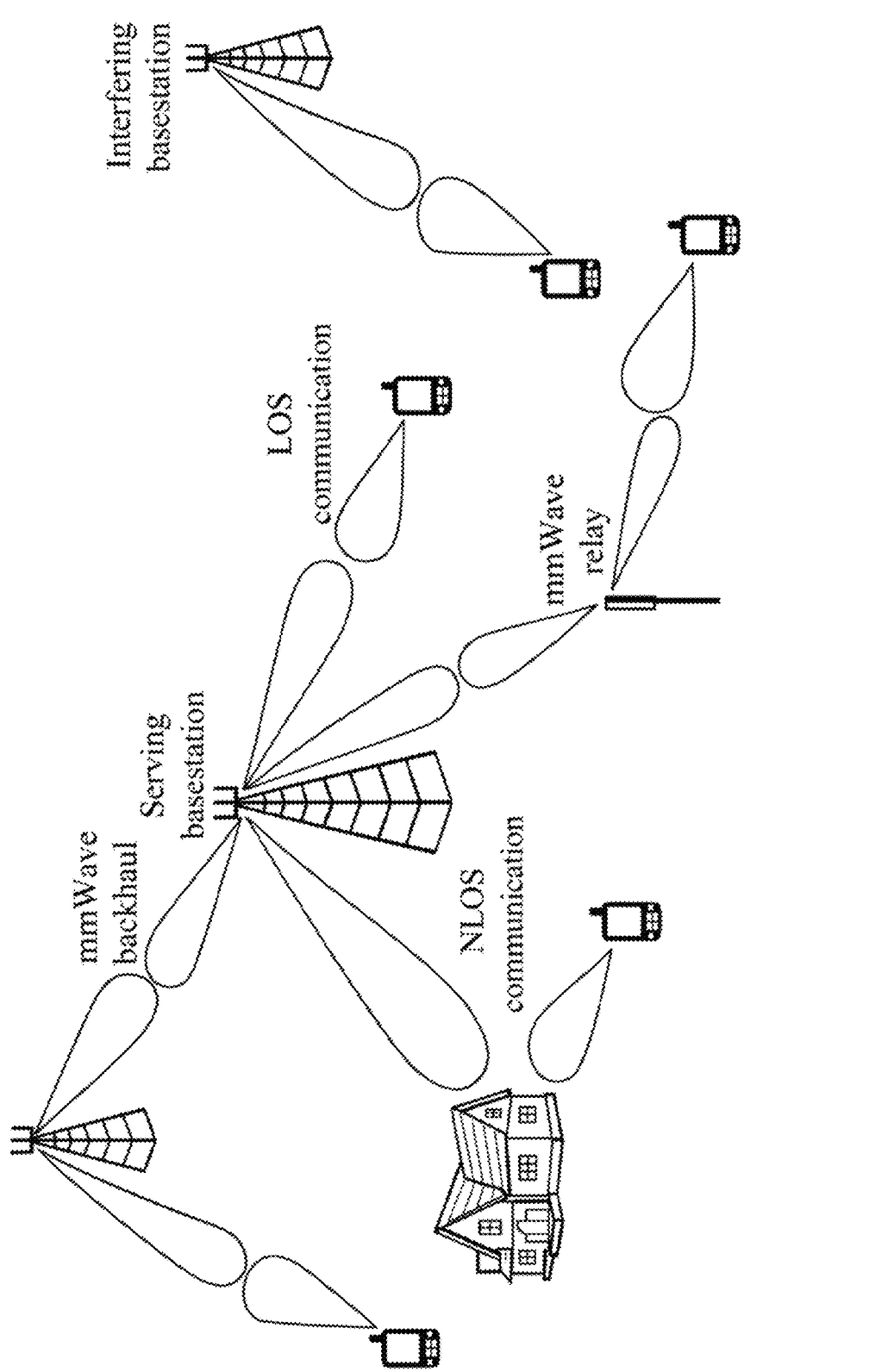
FIG. 21 is a block diagram of an example wireless repeater scenario.
Figure 22:
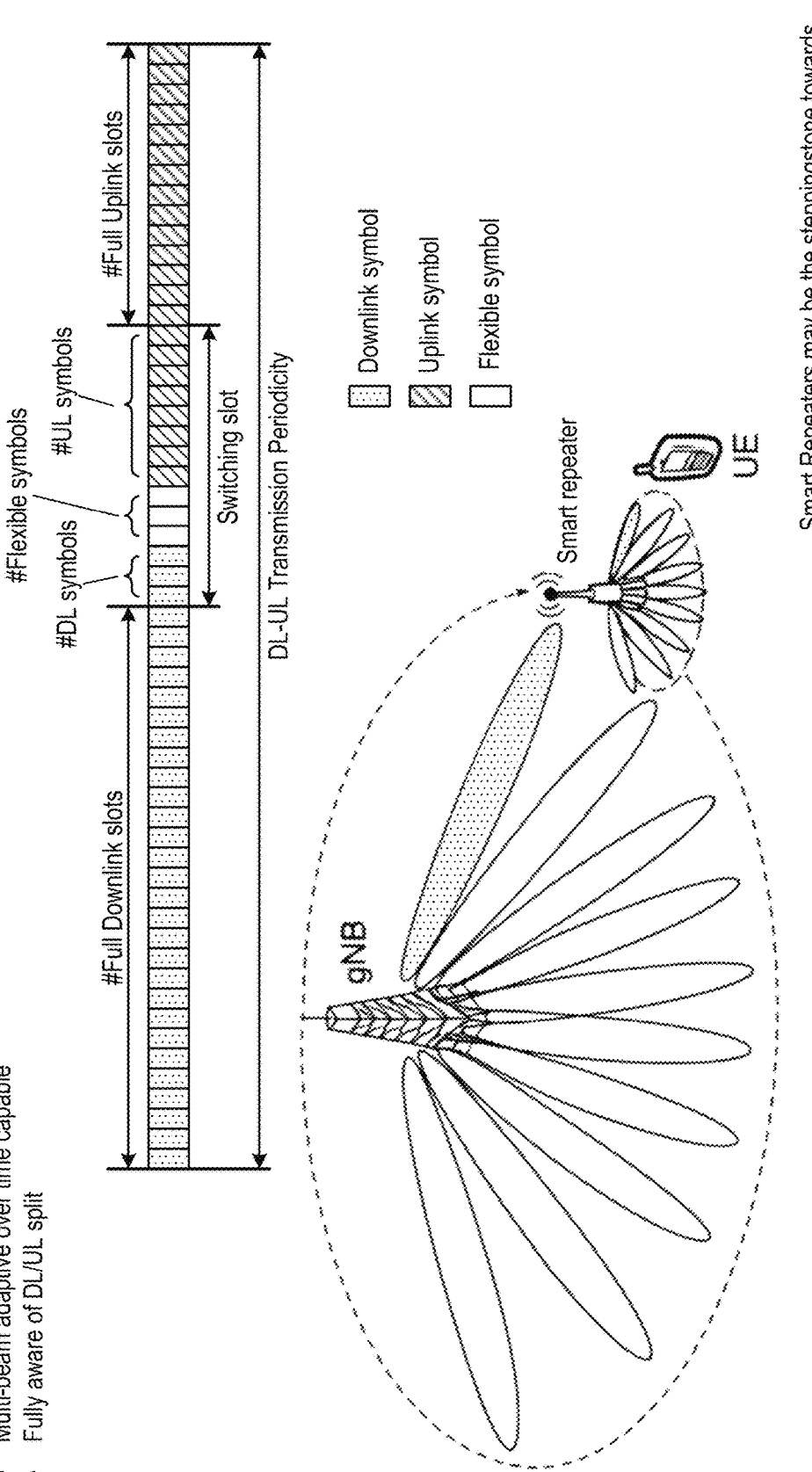
FIG. 22 is a block diagram illustrating an example smart wireless repeater scenario.

For example, FIG. 21 is a block diagram of an example wireless repeater scenario, including a serving wireless base station and a wireless repeater (mmWave relay). The wireless repeater may be configured to receive a signal via receiver beam #1 and to transmit the signal via transmitter beam #K. In existing technologies, a receiver antenna and/or a transmitter antenna configuration of a wireless repeater may be (pre-) configured in a semi-static manner. This may limit handling supporting mobile users by a wireless repeater. For example, a user of the wireless repeater may move from one location to another location which may require different beams or different transmitter antenna configurations to achieve good/better quality. In recent advanced technologies, a smart wireless repeater has been proposed where a smart wireless repeater may support dynamic beam adaptation and/or radio configuration parameters in transmitter and/or receiver antenna arrays/antenna based on side control information. For example, FIG. 22 is a block diagram illustrating an example smart wireless repeater scenario.

A smart wireless repeater may support multiple analog beams or multiple configurations for radio antenna array(s). For example, each oval in FIG. 22 may represent an analog beam or a radio antenna array(s)'s configuration. An analog beam may represent a set of parameters used for setting antenna array(s), for example, to satisfy spatial filter parameters and/or angle of arrival.

When either a wireless repeater or a smart wireless repeater is used between a base station (e.g., gNB) and a wireless device (e.g., user equipment (UE)), the wireless device may not be aware of whether the wireless repeater or the smart wireless repeater is being used. The wireless device may behave in a same manner in a first scenario where the wireless device directly communicates with the wireless base station and in a second scenario where the wireless device indirectly communicates with the wireless base station via the wireless repeater or the smart wireless repeater.

Figure 23:
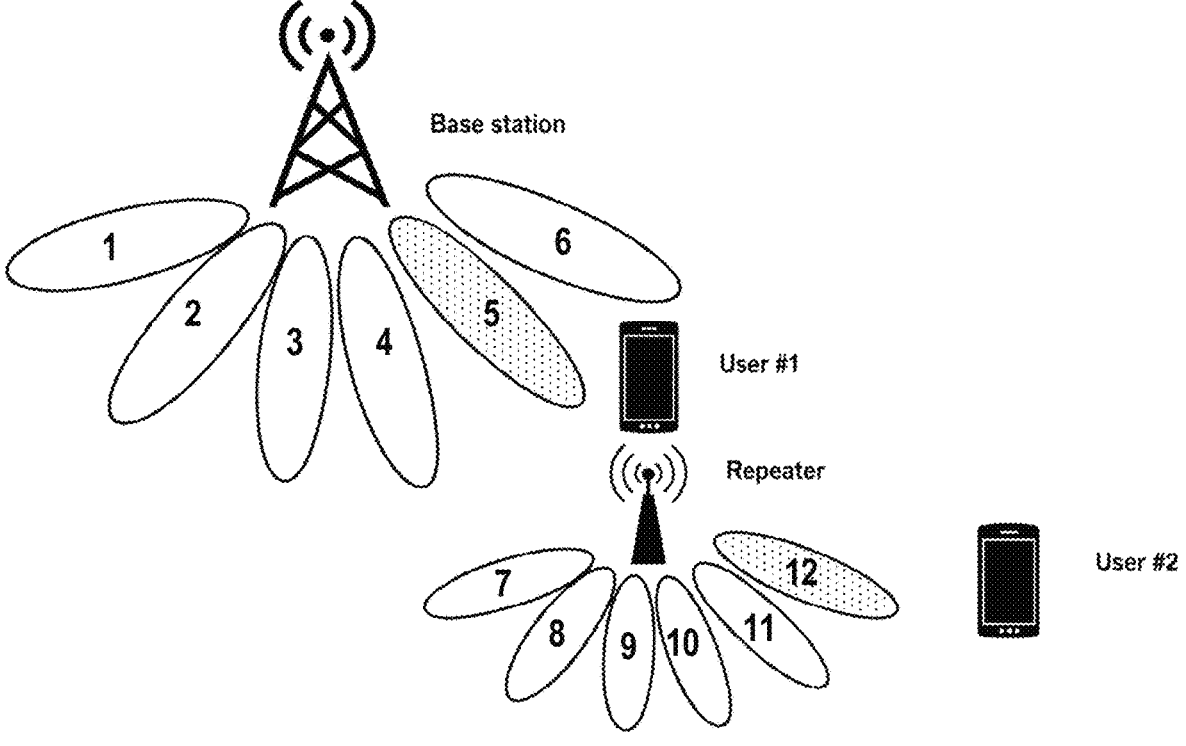
FIG. 23 is a block diagram of another example wireless repeater scenario.

For example, FIG. 23 is block diagram illustrating another wireless repeater scenario where a wireless base station may have user #1 that directly communicates with the wireless base station and user #2 that indirectly communicates with the wireless base station via a repeater.

In an example, the wireless base station may support 6 analog beams or 6 synchronization signal block (SSB) transmissions where each synchronization signal block is transmitted with a single analog beam or a spatial domain filter parameter. For example, the wireless base station may support 6 spatial domain filter parameters or analog beams (namely 1, 2, 3, . . . , 6 shown in ovals of the wireless base station). The wireless repeater may determine beam 5 (grayed oval) as a candidate beam or candidate synchronization signal block. The wireless repeater may receive transmissions from the wireless base station based on the beam 5 (e.g., receiver beam or spatial domain filter parameter of receiver beam or radio parameter of the receiver is aligned or corresponded to the beam 5). The wireless repeater may support beams (namely 7, 8, . . . , 12) where beam 12 is a candidate beam for user #2.

In existing technology, a wireless base station may transmit beam-swept synchronization signal blocks (e.g., SSB #1 with beam 1, SSB #2 with beam 2, . . . , SSB #6 with beam 6) for one or more beams that the wireless base station is configured to support or supports. A wireless device may determine a candidate synchronization signal block based on measurement over one or more received synchronization signal blocks. For example, when the wireless device determines a candidate beam K, the wireless device may determine a random access resource based on the candidate beam K (e.g., based on beam index of the candidate beam K or a slot index of a SSB with the beam K or based on a formula with the beam K). The wireless device may transmit a preamble based on the selected random access resource. The wireless base station may acquire the candidate beam K based on the random access resource. For example, when the wireless device determines the candidate beam as the beam 2, a corresponding random access resource to the beam 2 may be used for the preamble transmission. By receiving the preamble on the corresponding random access resource, the base station may acquire the candidate beam of the wireless device as the beam 2.

For example, in FIG. 22 the user #1 may select a first random access resource RA #1 that corresponds to the beam #5 when the user #1 determines a candidate beam or a candidate synchronization signal block with the beam #5 (e.g., a good quality of the received SSB via the beam #5). When the user #2 determines that the beam #12 is the best beam, which may correspond to the beam #6 of the base station, the user #2 may determine a second random access resource RA #2 that corresponds to the beam #6.

When the wireless base station receives a first preamble from the user #1 for the beam #5, the wireless base station may determine that a candidate beam for the user #1 is the beam #5. When the wireless base station receives a second preamble from the user #2 for the beam #6, the wireless base station may determine that a candidate beam for the user #2 is the beam #6. As the user #2 may be reached via the wireless repeater which is based on the beam #5, without knowing the presence of the repeater in between the wireless base station and the user #2, the wireless base station may not be able to configure beam #5 for the wireless repeater and beam #12 for the user #2 from the wireless repeater.

During initial access of a wireless device, a wireless base station may need to differentiate whether initial access of the wireless device is for a device directly communicating with the wireless base station or for a second wireless device indirectly communicating to the wireless base station via a wireless repeater.

In existing technologies, a wireless repeater may simply amplify and forward data regardless of whether data is for initial access or normal data. This may not allow a wireless base station to identify message(s) of an initial access generated from a directly communicating wireless device or an indirectly communicating wireless device. Mechanisms to support initial access to allow differentiation of device communication type (e.g., direct or indirect, e.g., single hop or multi-hop to the base station) without impacting the wireless device may be needed.

Figure 1:
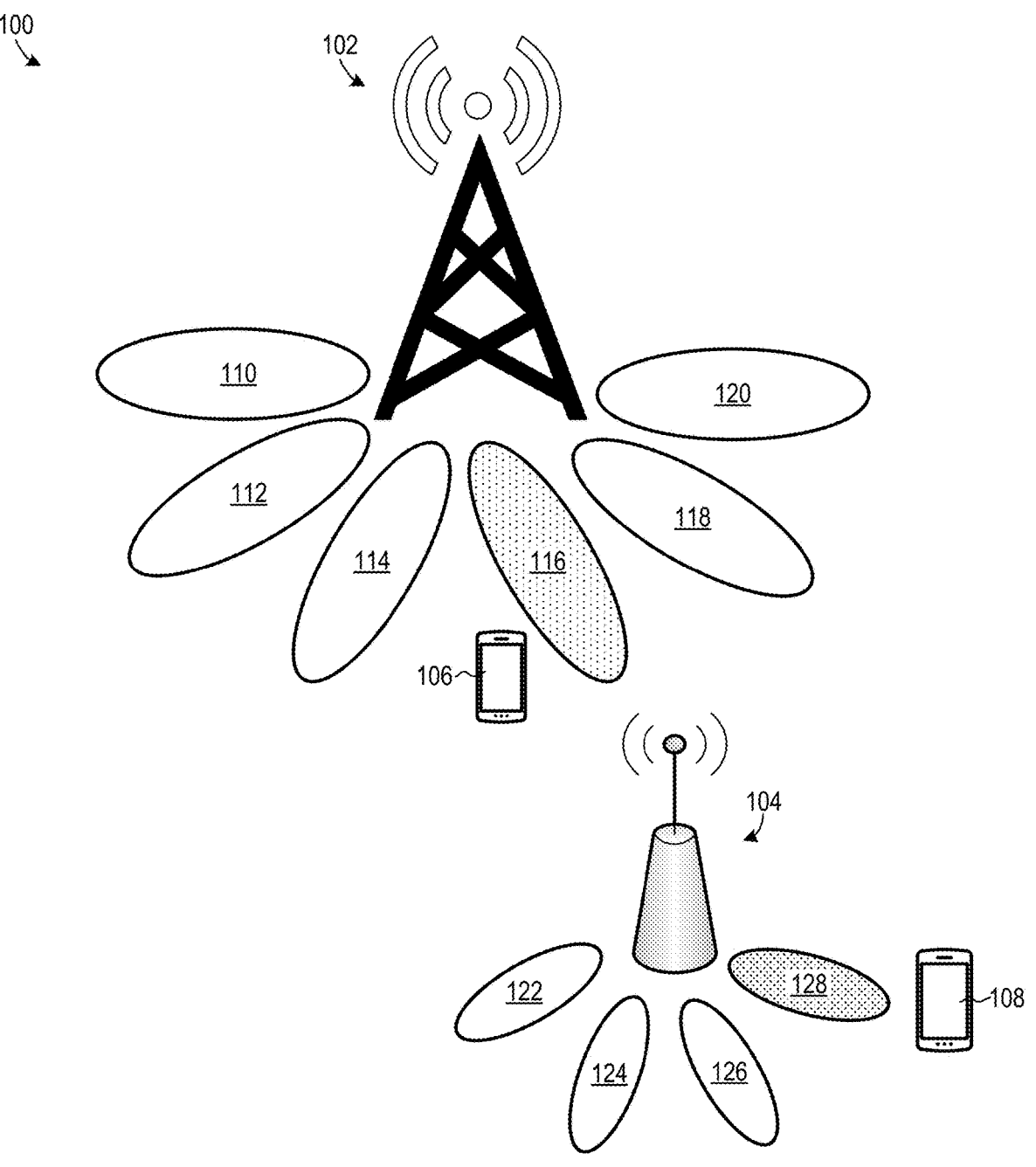
FIG. 1 is a block diagram of a wireless communication network including a wireless repeater.

For example, FIG. 1 is a block diagram of a wireless communication network 100 including a wireless base station 102, a wireless repeater 104, a first wireless device 106, and a second wireless device 108. In some embodiments, wireless base station 102 is a Third Generation Partnership (3GPP) wireless base station, e.g., an eNodeB, a gNodeB, a sixth generation (6G) wireless base station, or a successor, modification, or extension of any of the foregoing wireless base stations. Wireless base station 102 is configured to transmit and receive wireless communication data via any one of wireless communication beams 110, 112, 114, 116, 118, and 120 using radio frequency (RF) signals in one or more licensed radio frequency bands and/or unlicensed radio frequency bands, such as based on one or more a 3GPP Long Term Evolution (LTE) communication protocol, a 3GPP fifth generation (5G) communication protocol, a 3GPP 6G communication protocol, and extensions, modifications, or successors of any of the forementioned communication protocols. Wireless communication beams 110-120 are, for example, analog wireless communication beams. While wireless base station 102 is depicted as supporting six wireless communication beams, i.e., wireless communication beams 110-120, the number of wireless communication beams supported by wireless base station 102 may vary as a design choice and/or as a configuration choice.

Wireless repeater 104 is configured to receive wireless communication data, such as from wireless base station 102 via one or more of wireless communication beams 110-120, and forward the wireless communication data to one or more other nodes via any one of wireless communication beams 122, 124, 126, and 128. As such, wireless repeater 104 expands coverage of wireless base station 102 to additional wireless devices. Wireless repeater 104 does not process wireless communication data that it receives before forwarding the wireless communication data to another node. Certain embodiments of wireless repeater 104 are configured to receive and forward wireless communication data adhering to a 3GPP communication protocol, e.g., according to one or more of a 3GPP LTE communication protocol, a 3GPP 5G communication protocol, a 3GPP 6G communication protocol, and extensions, modifications, or successors of any of the forementioned communication protocols. Wireless communication beams 122, 124, 126, and 128 are, for example, analog wireless communication beams that are different from wireless communication beams 110-120 of wireless base station 102. While wireless repeater 104 is depicted as supporting four wireless communication beams, i.e., wireless communication beams 122-128, the number of wireless communication beams supported by wireless repeater 104 may vary as a design choice and/or a configuration choice.

Each of first wireless device 106 and second wireless device 108 is depicted as being a mobile telephone. However, one or both of first wireless device 106 and second wireless device 108 could be another type of wireless device, including but not limited to a computer, a set-top device, a data storage device, an Internet of Things (IoT) device, an entertainment device, a computer networking device, a smartwatch, a wearable device with wireless capability, a medical device, a security device, a monitoring device, a wireless communication device, e.g., another wireless base station or another wireless repeater, and/or a wireless access device. While FIG. 1 illustrates wireless communication network 100 as including two wireless devices, the number of wireless devices supported by wireless communication network 100 may vary. For example, wireless communication network 100 may include tens, hundreds, thousands, or more of wireless devices. Additionally, wireless communication network 100 could (and frequently will) include additional wireless base stations and/or additional wireless repeaters. Moreover, wireless communication network 100 could (and typically will) include additional elements, such as a core network (e.g., a 3GPP core network such as an Evolved Packet Core (EPC), a 5G core network, and/or a 6G core network) and X-haul communication links, where X-haul may be one or more of back-haul, mid-haul, and front-haul.

First wireless device 106 is supported by wireless communication beam 116 of wireless base station 102, and first wireless device 106 is therefore directly connected to wireless base station 102. Wireless repeater 104 is also supported by wireless communication beam 116 of wireless base station 102, as symbolically shown wireless communication beam 116 being shaded, and second wireless device 108 is supported by wireless communication beam 128 of wireless repeater 104, as symbolically shown by wireless communication beam 128 being shaded. As such, second wireless device 108 is indirectly connected to wireless base station 102, i.e., second wireless device 108 is connected to wireless base station 102 via wireless repeater 104. Accordingly, wireless repeater 104 receives downlink wireless communication data destined for second wireless device 108 via wireless communication beam 116, and wireless repeater 104 forwards the downlink wireless communication data to second wireless device 108 via wireless communication beam 128, without processing the downlink communication wireless data. Additionally, wireless repeater 104 receives uplink wireless communication data from second wireless device 108 via wireless communication beam 128, and wireless repeater 104 forwards the uplink wireless communication data to wireless base station 102 via wireless communication beam 116, without processing the uplink wireless data. Examples of processing wireless communication data include, but are not limited to, one or more of decoding received wireless communication data, generating new wireless communication data based on decoded wireless communication data, scheduling different time/frequency resources for transmission of wireless communication data from a wireless repeater to another node than were used to transmit the wireless communication data to the wireless repeater, and determining beam information of forwarding based on received wireless communication data. However, in this document, "processing" of wireless communication data excludes amplifying the wireless communication data. Accordingly, certain embodiments of wireless repeater 104 are configured to amplify received wireless communication data before forwarding the wireless communication data, even though wireless repeater 104 does not process received wireless communication data before forwarding the data.

In particular embodiments, wireless repeater 104 is transparent to first wireless device 106 and second wireless device 108, or stated differently, in particular embodiments, neither first wireless device 106 nor second wireless device 108 are aware of the presence of wireless repeater 104, even though second wireless device 108 is connected to wireless base station 102 via wireless repeater 104. Accordingly, first wireless device 106 and second wireless device 108 are optionally conventional wireless devices, i.e., that are not specially configured to operate with wireless repeater 104.

In some embodiments, each of first wireless device 106 and second wireless device 108 performs a conventional initial access procedure, such as a random access (RACH) procedure, to access wireless communication network 100. For example, in certain embodiments, each of first wireless device 106 and second wireless device 108 performs a 3GPP RACH procedure, such as 5G new radio (NR) contention-based random access procedure, or a 5G NR contention-free random access procedure, to access wireless communication network 100. Wireless base station 102 is also configured to determine a respective best wireless communication beam 110, 112, 114, 116, 118, or 120 for each of first wireless device 106 and second wireless device 108 based on the initial access procedure.

In certain embodiments, wireless base station 102 transmits a set of beam-swept synchronization signal blocks using a first resource set (e.g., a set of time, frequency, and spatial resources), during an initial access procedure. For example, wireless base station 102 may transmit a respective synchronization signal block for each of wireless communication beams 110-120, where each synchronization signal block may be transmitted in a different slot, and each slot encompasses a different respective time span. For instance, wireless base station 102 may transmit a first synchronization signal block with wireless communication beam 110 in a slot n, a second synchronization signal block with wireless communication beam 112 in a slot n+1, a third synchronization signal block with wireless communication beam 114 in a slot n+3, and so on. Wireless repeater 104 receives the beam-swept synchronization signal blocks via a best wireless communication beam of all wireless communication beams 110-120 of wireless base station 102, from the perspective of wireless repeater 104. In this example, wireless communication beam 116 is a best wireless communication beam. For example, wireless repeater 104 may determine that wireless communication beam 116 is a best wireless communication beam in response to wireless communication beam 116 having a highest received signal level of all wireless communication beams received at wireless repeater 104, wireless communication beam 116 having a highest signal to noise ratio of all wireless communication beams received at wireless repeater 104, etc. Particular embodiments of wireless repeater 104 do not implement 3GPP Re-18 enhancements or have a minimal configuration. In these embodiments, wireless repeater 104 is configured to the address beam-swept synchronization signal blocks according to one of the following four procedures: (a) blindly forward the entire set of beam-swept synchronization signal blocks, (b) forward the beam-swept synchronization signal blocks according to a pre-configured pattern, (c) not forward any of the beam-swept synchronization signal blocks, or (d) forward only a synchronization signal block corresponding to the best wireless communication beam from the perspective of wireless repeater 104, i.e., wireless communication beam 116 in the FIG. 1 example. In cases where wireless repeater 104 forwards some or all of the beam-swept synchronization signal blocks, wireless repeater 104 may forward the beam-swept synchronization signal blocks using a resource set (e.g., a set of time, frequency, and spatial resources) that is encompassed by the first resource set used by wireless base station 102.

In scenarios where wireless repeater 104 forwards beam-swept synchronization signal blocks, such as according to any one of procedures (a), (b), or (d) discussed above, first wireless device 106 may receive a respective synchronization signal block via two paths, i.e., from each of wireless base station 102 and wireless repeater 104. Consequently, first wireless device 106 may determine a RF pattern/configuration from the combination of respective wireless communication beams of each of wireless base station 102 and wireless repeater 104, while selecting a random access procedure preamble resource according to a synchronization signal block index of a wireless communication beam of wireless base station 102, e.g., wireless communication beam 116. First wireless device 106 may then determine spatial domain filter parameters for preamble transmission based on the determined RF pattern/configuration, which may result in misalignment between a wireless communication beam used by first wireless device 106 to transmit the preamble to wireless base station 102 and the synchronization signal block associated with the preamble, as well as poor reception of the preamble by wireless base station 102.

Additionally, as discussed above, second wireless device 108 may not be aware of presence of wireless repeater 104 even though second wireless device 108 is connected to wireless base station 102 via wireless repeater 104. In scenarios where wireless repeater 104 forwards beam-swept synchronization signal blocks, second wireless device 108 may determine that wireless communication beam 128 is a candidate wireless communication beam, and second wireless device 108 may therefore determine an initial access preamble based on wireless communication beam 128. However, wireless base station 102 may have reserved this preamble resource for wireless communication beam 118, which may have the same synchronization signal block index as wireless communication beam 128. When second wireless device 108 transmits a preamble via the determined preamble resource using a spatial domain filter parameter based on wireless communication beam 128, wireless repeater 104 may (1) receive the preamble via wireless communication beam 128 and (2) amplify and transmit the preamble to wireless base station 102 via wireless communication beam 116 using the preamble resource reserved for wireless communication beam 118. In view of the preamble resource being reserved for wireless communication beam 118, wireless base station 102 may expect to receive further initial access communication from second wireless device 108 via wireless communication beam 118, while second wireless device 108 is actually connected to wireless base station 102 via wireless repeater 104 and wireless communication beam 116. Consequently, wireless base station 102 may not successfully receive the preamble, or further initial access signaling, from second wireless device 108. Moreover, even if wireless base station 102 receives the preamble from second wireless device 108, wireless base station 102 may not be aware that the preamble was transmitted to wireless base station 102 via wireless repeater 104.

Such misalignment or performance degradation of preamble reception may prevent second wireless device 108 from successfully completing an initial access procedure. For example, even if wireless base station 102 receives the preamble from second wireless device 108, wireless base station 102 may transmit a random access response based on wireless communication beam 118, in view of the preamble resource being associated with wireless communication beam 118. Consequently, wireless repeater 104 may not be able to successfully receive the random access response. Moreover, when wireless repeater 104 forwards/repeats the preamble from second wireless device 108, wireless repeater 104 may determine a transmission power based on wireless communication beam 116, in view of wireless communication beam being a candidate wireless communication beam for wireless repeater 104. Consequently, an inaccurate power transmission level may be used by wireless repeater 104 during initial access of second wireless device 108.

On the other hand, in a scenario where wireless repeater 104 does not forward any beam-swept synchronization signal blocks, such as according to procedure (c) discussed above, second wireless device 108 may be unable to receive any synchronization signal blocks from wireless base station 102, which may prevent second wireless device 108 from performing an initial access procedure, e.g., in embodiments where wireless communication network 100 is a 5G NR stand-alone (SA) network. As such, there may be problems with initial access in wireless communication network 100 irrespective of whether wireless repeater 104 forwards beam-swept synchronization signal blocks that it receives from wireless base station 102.

Disclosed herein are systems and methods for initial access in a communication network including a wireless repeater which at least partially overcome one or more of the drawbacks discussed above. Particular embodiments of the new systems and methods advantageously promote coverage of wireless devices served by a wireless repeater during initial access, while helping minimize negative impact on wireless devices directly connected to a wireless base station during initial access. For example, in particular embodiments, a wireless base station allocates one or more additional initial access resources, e.g., additional synchronization signal blocks, to support one or more wireless repeaters. Additionally, in some embodiments, a wireless repeater is configured to selectively forward synchronization signal blocks and/or initial access preambles that it receives, such as in response to configuration parameters and/or a dynamic slot format indicator. Furthermore, in particular embodiments, a wireless repeater is configured to address received wireless data according to dynamic slot format indicators.

Figure 2:
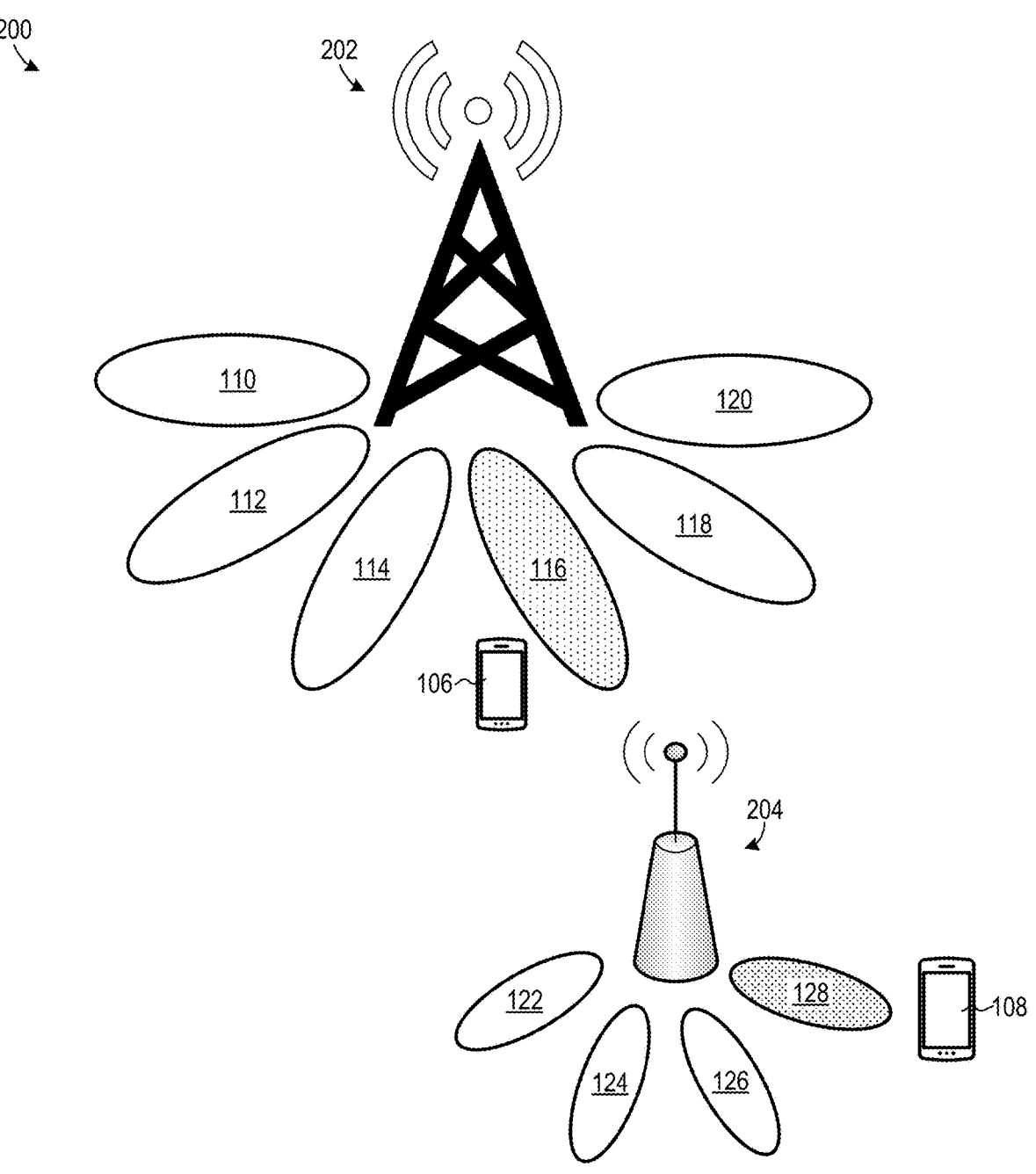
FIG. 2 is a block diagram of a wireless communication network where a wireless base station is configured to support additional synchronization blocks for a wireless repeater, according to an embodiment.

Certain embodiments of the new systems and methods disclosed herein support additional synchronization signal blocks for one or more wireless repeaters, such as a respective synchronization signal block for each wireless communication beam of one or more wireless repeaters, where each synchronization signal block in a given synchronization signal block burst has a different respective index. For example, FIG. 2 is a block diagram of a wireless communication network 200, which is similar to wireless communication network 100 (FIG. 1) but including a wireless base station 202 and a wireless repeater 204 in place of wireless base station 102 and wireless repeater 104, respectively. Wireless base station 202 is like wireless base station 102, but wireless base station 202 is configured to support additional synchronization signal blocks for wireless repeater 204, such as one additional synchronization signal block for each of wireless communication beams 122-128.

Figure 3:
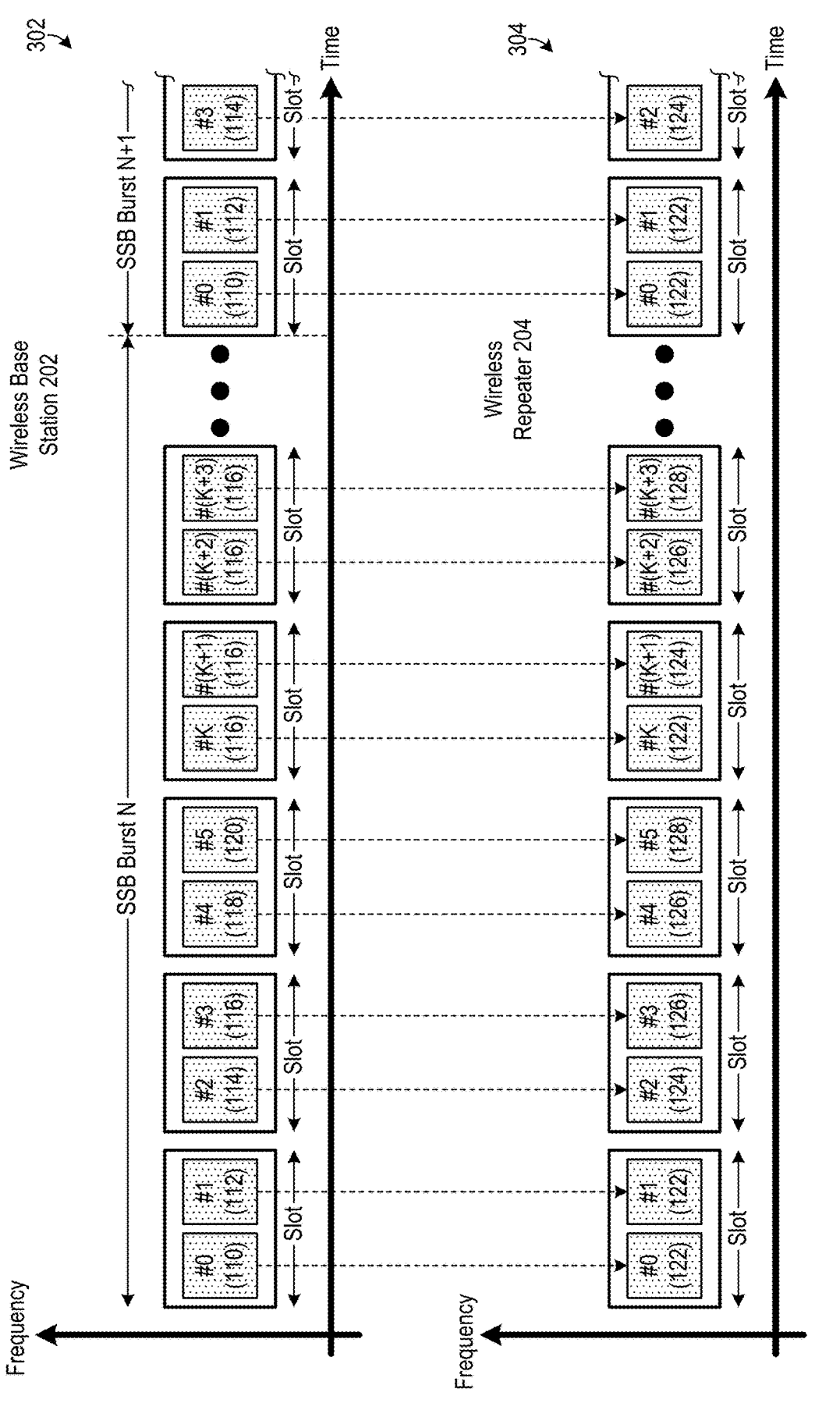
FIG. 3 includes two graphs illustrating one example of a synchronization signal block configuration in the FIG. 2 wireless communication network.

FIG. 3 includes two graphs 302 and 304 illustrating one example of a synchronization signal block configuration in wireless communication network 200. Graph 302 is of wireless base station 202 resources in frequency versus time, and graph 304 is of wireless repeater 204 resources in frequency versus time. In this example, wireless base station 202 periodically transmits synchronization signal bursts designated in FIG. 3 as SSB Burst N, SSB Burst N+1, etc. Each synchronization signal burst includes a plurality of synchronization signal blocks, symbolically shown as shaded boxes, having a respective index #. Each synchronization signal block of FIG. 3 may be referred to "SSB #x," where "x" is an index number of the synchronization signal block. For example, a synchronization signal block having index #0 is referred to as SSB #0, a synchronization signal block having index #1 is referred to as SSB #1, and so on. Each synchronization signal block of graph 302 is assigned to a respective wireless communication beam of wireless base station 202, where the assigned wireless communication beam is shown in parenthesis. For example, SSB #0 is assigned to wireless communication beam 110, SSB #1 is assigned to wireless communication beam 112, and so on. Wireless base station 202 transmits each synchronization signal block via its assigned wireless communication beam, such as using a spatial filter parameter for each wireless communication beam.

A respective synchronization signal block is assigned to each wireless communication beam of wireless base station 202. It should be noted that wireless base station 202 supports an additional synchronization signal block for each of the four wireless communication beams of wireless repeater 204, where the additional synchronization signal blocks have respective indexes beginning with #K. Each of the additional synchronization signals blocks is assigned to wireless communication beam 116 in view of wireless communication beam 116 being the best wireless communication beam from the perspective of wireless repeater 204.

Wireless repeater 204 is a smart wireless repeater that is configured to forward synchronization signal blocks that it receives from wireless base station 202 according to a particular beam pattern, such as a predetermined beam pattern. For example, graph 304 illustrates wireless repeater 204 forwarding synchronization signals blocks that it receives from wireless base station 202 according to following repetitive pattern: forward SSB #0 via wireless communication beam 122, forward SSB #1 via wireless communication beam 122, forward SSB #2 via wireless communication beam 124, forward SSB #3 via wireless communication beam 126, forward SSB #4 via wireless communication beam 126, forward SSB #5 via wireless communication beam 128, forward SSB #K via wireless communication beam 122, forward SSB #(K+1) via wireless communication beam 124, forward SSB #(K+2) via wireless communication beam 126, and forward SSB #(K+3) via wireless communication beam 128. However, wireless repeater 204 may be configured to forward synchronization signals block that it receives from wireless base station 202 according to a different beam pattern without departing from the scope hereof.

First wireless device 106 may experience performance degradation in wireless communication network 200 even though wireless base station 202 allocates additional synchronization signal blocks for wireless repeater 204. For example, first wireless device 106 may determine that SSB #K is associated with a best wireless communication beam received by first wireless device 106 (even though SSB #K is allocated to wireless repeater 204), and first wireless device 106 may therefore apply a spatial domain filter to its preamble based on SSB #K, resulting in performance degradation at wireless base station 202.

Some alternate embodiments of wireless repeater 204 are configured to selectively forward synchronization signal blocks and other initial access signaling received from wireless base station 202, instead of forwarding all synchronization signal blocks and other initial access signaling received from wireless base station 202, such as in accordance with configuration parameters received from wireless base station 202 and/or another element of wireless communication network 200. Such selective forwarding of synchronization signal blocks by wireless repeater 204 may result in wireless repeater 204 forwarding synchronization signal blocks at different times than wireless base station 202, which may minimize performance degradation of first wireless device 106 caused by wireless repeater 204, as well as improve performance of wireless communication network 200.

Figure 4:
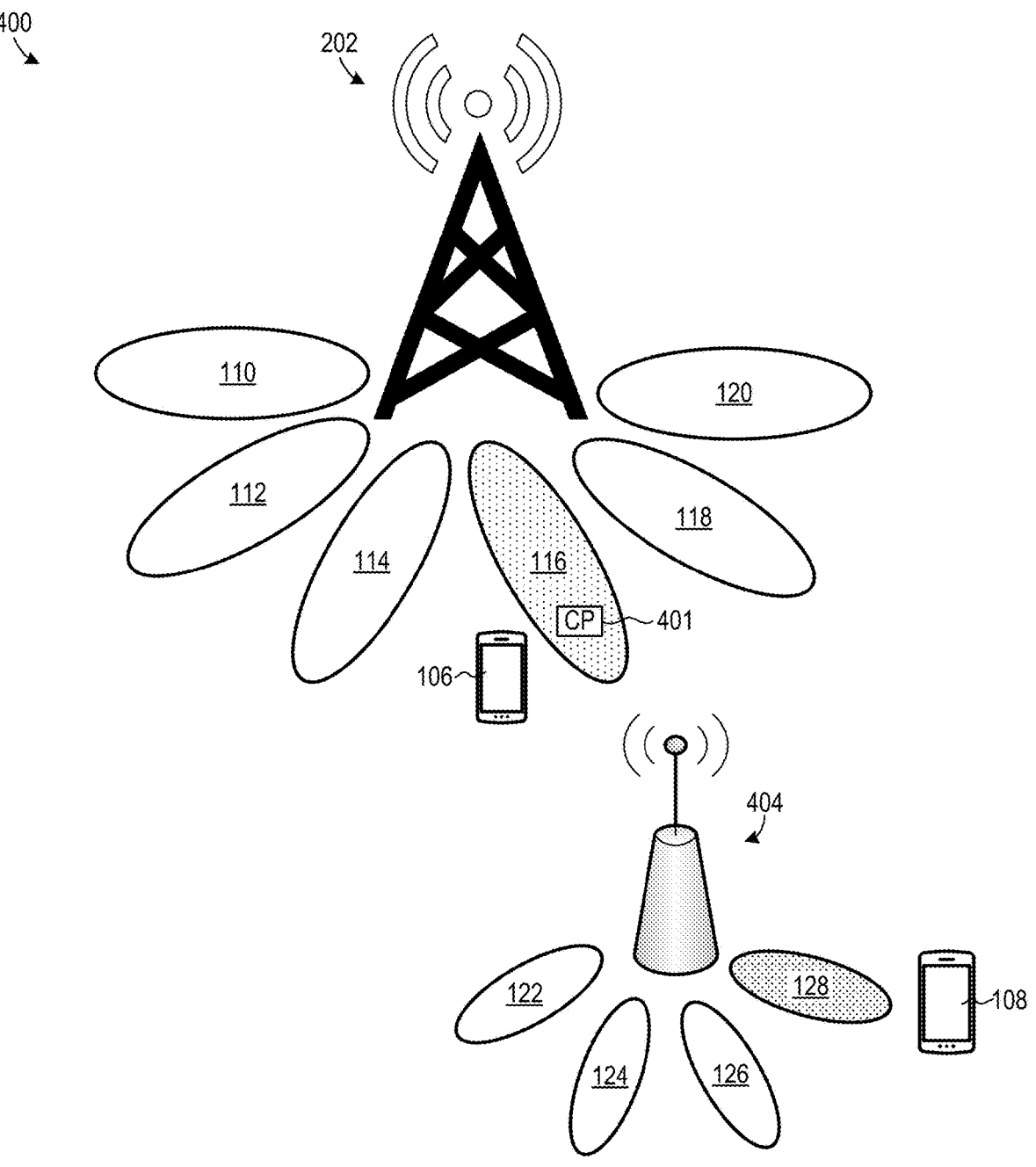
FIG. 4 is a block diagram of a wireless communication network including an alternate embodiment of the FIG. 2 wireless repeater that is configured to selectively forward synchronization signal blocks.

For example, FIG. 4 is a block diagram of a wireless communication network 400, which is an alternate embodiment of wireless communication network 200 (FIG. 2) including a wireless repeater 404 in place of wireless repeater 204. Wireless repeater 404 is configured to selectively forward synchronization signals blocks, and optionally other wireless communication data, received from wireless base station 202 at least partially in accordance with configuration parameters (CP) 401 received from wireless base station 202 via wireless communication beam 116. In some embodiments, wireless base station 202 generates configuration parameters 401, while in some other embodiments, configuration parameters 401 are at least partially generated external to wireless base station 202, e.g., at a core network (not shown) of wireless communication network 400. Configuration parameters 401 indicate, for example, which synchronization signals blocks wireless repeater 404 should forward and/or which synchronization signals blocks wireless repeater 404 should not forward. In certain embodiments, configuration parameters 401 include one or more of (1) time resources overlapping with synchronization signal block resources of wireless base station 202 and (2) time resources overlapping with preamble resources of wireless base station 202. In some embodiments, configuration parameters 401 directly or indirectly indicate that wireless repeater should (1) not forward synchronization signal blocks allocated to wireless communication beams of wireless base station 202 and (2) forward synchronization signal blocks allocated to wireless communication beams of wireless repeater 404. It should be noted that while wireless repeater 404 is configured to selectively forward synchronization signal blocks, wireless repeater 404 does not process synchronization signal blocks, or other wireless communication data, received from wireless base station 202, although some embodiments of wireless repeater 404 may buffer some received synchronization signal blocks or other wireless communication data. Additionally, particular embodiments of wireless base station 202 are configured to exclude synchronization signal blocks allocated to wireless repeater 404 in beam-swept synchronization signal blocks.

Furthermore, some embodiments of wireless repeater 404 are configured to selectively forward initial access preambles received by wireless repeater 404, such as to according to whether a received initial access preamble, as identified by its index, corresponds to a synchronization signal block allocated to wireless repeater 404. For example, wireless repeater 404 may be configured to forward a received initial access preamble associated with SSB #(K+1) to wireless base station 202 because SSB #(K+1) is allocated to wireless repeater 404, and wireless repeater 404 may be configured to not forward a received initial access preamble associated with SSB #1 to wireless base station 202 because SSB #1 is not associated with wireless repeater 404.

Figure 5:
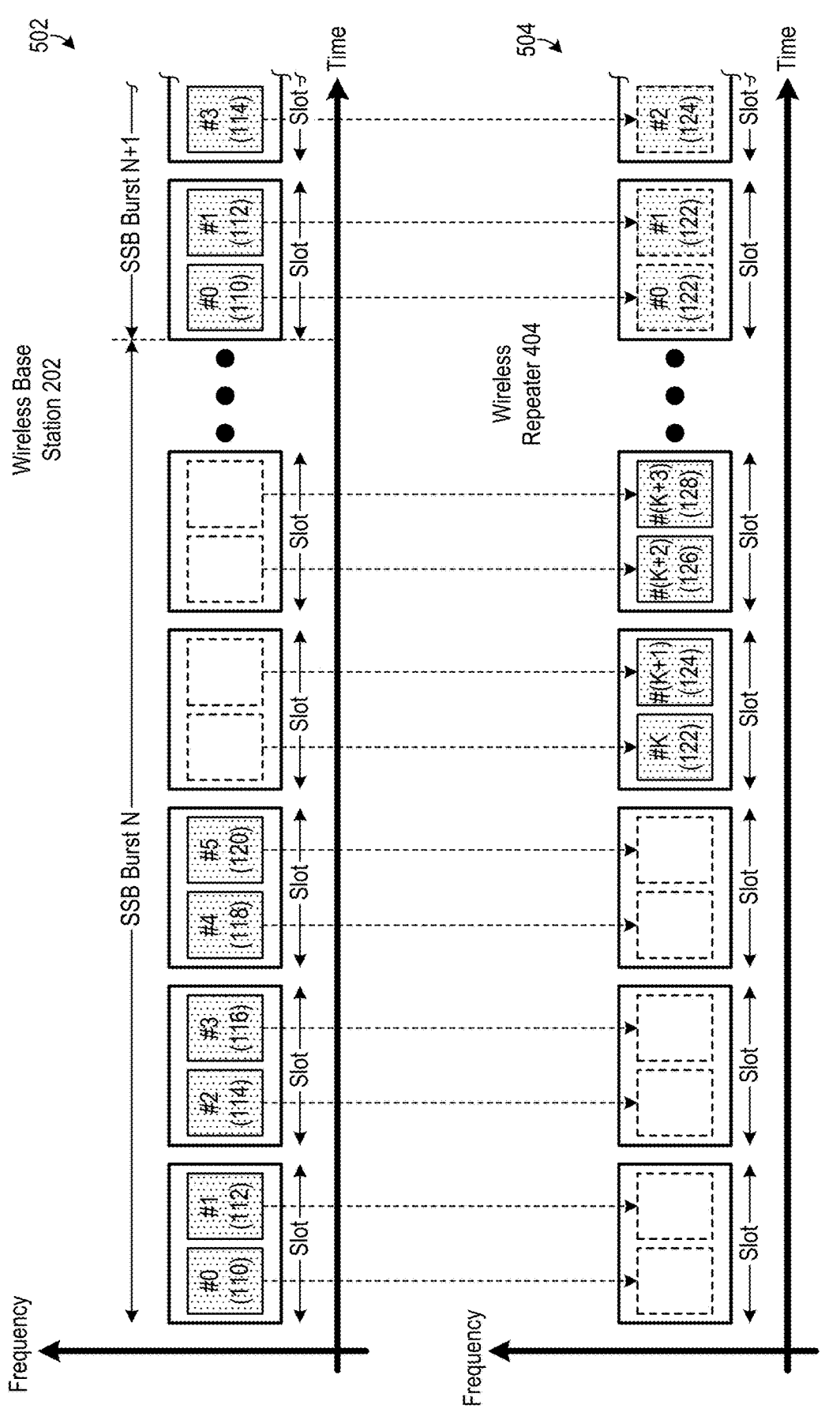
FIG. 5 includes two graphs illustrating one example of a synchronization signal block configuration in the FIG. 4 wireless communication network.

FIG. 5 includes two graphs 502 and 504 illustrating one example of a synchronization signal block configuration in wireless communication network 400. Graphs 502 and 504 are analogous to graphs 302 and 304 of FIG. 3, respectively. In this example, wireless repeater 404 determines from configuration parameter 401 that synchronization signal blocks allocated to wireless base station 202 should not be forwarded. In response thereto, wireless repeater 404 does not forward synchronization signal blocks allocated to wireless base station 202, as symbolically shown by the first six synchronization signal blocks in graph 504 having dashed outlines. Additionally, wireless base station 202 does not transmit synchronization signal blocks allocated to wireless repeater 404 in beam-swept synchronization signal blocks, as symbolically shown by the seventh through tenth synchronization signal blocks of graph 502 having dashed outlines. However, wireless repeater 404 determines from configuration parameter 401 that synchronization signal blocks allocated to wireless repeater 404 should be forwarded. In response thereto, wireless repeater 404 transmits synchronization signal blocks allocated to wireless repeater 404 in fifth and sixth slots of each synchronization signal burst. Consequently, synchronization signals blocks allocated to wireless base station 202 are transmitted at different times than synchronization signals blocks allocated to wireless repeater 404, which helps eliminate the possibility of first wireless device 106 identifying a best beam from the combination of respective wireless communication beams of each of wireless base station 202 and wireless repeater 404.

Additionally, particular embodiments of wireless base station 202 are capable of determining whether a wireless device is directly connected to wireless base station 202 or whether the wireless device is connected to wireless base station 202 via wireless repeater 404 from an initial access preamble transmitted by the wireless device, e.g., based on time and/or frequency resources of the preamble. Furthermore, some embodiments of wireless base station 202 are configured to allocate additional initial access preambles to wireless repeater 404 that wireless repeater 404 may forward to wireless base station 202.

Particular embodiments of wireless base station 202 are configured to transmit SSB #K-SSB #(K+3) to wireless repeater 404 via wireless communication beam 116 using additional initial access resources. In these embodiments, wireless base station 202 is configured to not transmit other data on these additional initial resources, and wireless base station 202 may inform one or more wireless devices that the additional initial access resources are dedicated to synchronization symbol block transmission. For example, wireless base station 202 may configure ssb-PositionsInBurst to include resources/indexes of six synchronization signal blocks allocated to wireless base station 202, as well as resources/indexes of additional synchronization signal blocks allocated to wireless repeater 404. In embodiments where wireless communication network 400 includes additional wireless repeaters (not shown), wireless base station 202 may allocate initial access resources to each wireless repeater. However, in embodiments with multiple wireless repeaters, initial access resources allocated to two or more wireless repeaters may overlap. In embodiments where wireless base station 202 is to transmit SSB #K-SSB #(K+3) to wireless repeater 404 via wireless communication beam 116 using additional initial access resources, wireless repeater 404 may be configured to buffer SSB #K-SSB #(K+3) for transmission beginning at the fourth slot of each synchronization signal burst.

As one example of operation of wireless repeater 404, in a particular embodiment, wireless repeater 404 receives configuration parameters 401 including at least first wireless communication beam information and second wireless communication beam information. The first wireless communication beam information specifies operation of wireless repeater 404 with respect to one or more first time resources, where the one or more first time resources overlap with one or more first signal (e.g., a synchronization signal block (SSB), a channel state information reference signal (CSI-RS), and/or downlink control information (DCI)) resources of wireless base station 202. The second wireless communication beam information specifies operation of wireless repeater 404 with respect to one or more second time resources, where the one or more second time resources overlap with one or more second signal (e.g., synchronization signal block, CSI-RS. DCI) resources of wireless base station 202. Wireless repeater 404 then determines from the first wireless communication beam information that wireless communication data received via the one or more first signal (e.g., SSB, CSI-RS, DCI) resources of wireless base station 202 should be forwarded, and in response thereto, wireless repeater 404 forwards the wireless communication data to one or more wireless devices. Additionally, wireless repeater 404 determines from the second wireless communication beam information that wireless communication data received via the one or more second signal (e.g., SSB, CSI-RS, DCI) resources of wireless base station 202 should not be forwarded, and wireless repeater 404 accordingly does not forward the wireless communication data.

As another example of operation of wireless repeater 404, in a particular embodiment, wireless repeater 404 receives configuration parameters 401 including at least first wireless communication beam information and second wireless communication beam information. The first wireless communication beam information specifies operation of wireless repeater 404 with respect to one or more first time resources, where the one or more first time resources overlap with one or more first uplink signal resources (e.g., preamble resources and/or configured grant resources) of wireless base station 202. The second wireless communication beam information specifies operation of wireless repeater 404 with respect to one or more second time resources, where the one or more second time resources overlap with one or more second uplink signal resources (e.g., preamble resources and/or configured grant resources) of wireless base station 202. Wireless repeater 404 then determines from the first wireless communication beam information that wireless communication data received from one or more wireless devices via the one or more first uplink signal resources (e.g., preamble resources and/or configured grant resources) of wireless base station 202 should be forwarded, and in response thereto, wireless repeater 404 forwards the wireless communication data to wireless base station 202. Additionally, wireless repeater 404 determines from the second wireless communication beam information that wireless communication data received, from one or more second wireless devices, via the one or more second uplink signal resources (e.g., preamble resources, configured grant resources) of wireless base station 202 should not be forwarded to the wireless base station 202, and wireless repeater 404 accordingly does not forward the wireless communication data.

As an additional example of operation of wireless repeater 404, in a particular embodiment, wireless repeater 404 receives, from wireless base station 202, configuration parameters of wireless repeater 404 operation, indicating at least the following: (1) one or more first beam information indicating one or more first time resources, where the one or more first time resources overlap with one or more first synchronization signal block (SSB) resources of wireless base station 202, and (2) one or more second beam information indicating one or more second time resources, where the one or more second time resources overlap with one or more second SSB resources of wireless base station 202. Based on the configuration parameters, wireless repeater 404 performs the following actions: (1) repeating signals, received via the one or more first SSB resources from wireless base station 202, based on the one or more first beam information, to one or more wireless devices, and (2) skipping repeating signals, received via the one or more second SSB resources from wireless base station 202.

As a further example of operation of wireless repeater 404, in a particular embodiment, wireless repeater 404 receives, from wireless base station 202, configuration parameters of wireless repeater 404 operation, indicating at least the following: (1) one or more first beam information indicating one or more first time resources, where the one or more first time resources overlap with one or more first preamble resources of wireless base station 202, and (2) one or more second beam information indicating one or more second time resources, where the one or more second time resources overlap with one or more second preamble resources of wireless base station 202. Based on the configuration parameters, wireless repeater 404 performs the following actions: (1) repeating signals, received via the one or more first preamble resources from one or more first wireless devices, based on the one or more first beam information, to wireless base station 202, and (2) skipping repeating signals, received via the one or more second SSB resources from one more or more second wireless devices.

The aforementioned selective forwarding of synchronization signal blocks by wireless repeater 404 may mitigate performance degradation experienced by first wireless device 106 from wireless repeater 404 during initial access. However, number of allocated synchronization signal blocks may be limited in some applications, which may limit number of wireless repeaters and/or additional wireless communication beams that may be supported in wireless communication network 400, such as depending on how many wireless communication beams base stations support. For example, synchronization signal blocks for allocation to wireless repeaters may be limited to synchronization signal blocks that are not allocated to wireless base stations. Consequently, the operating principle of wireless communication network 400 may not be sufficiently scalable, or feasible to apply, in some applications.

When a wireless device accesses wireless base station 202 via wireless repeater 404 in a multi-beam scenario, it may be desirable for wireless base station 202 to differentiate the wireless device from other wireless devices that are directly connected wireless base station 202. For example, wireless base station 202 may need to configure different transmission configuration indicator (TCI) states for (1) second wireless device 108 connected to wireless base station 202 via wireless repeater 404 and (2) first wireless device 106 directly connected to wireless base station 202, even though the best wireless communication beam of wireless repeater 404 is same as the best wireless communication beam of first wireless device 106. TCI state for a wireless device may be determined, for example, based on a communication link between the wireless device and wireless repeater 402.

Accordingly, some embodiments of wireless base station 202 are further configured to determine that a given wireless device is connected to wireless base station 202 via wireless repeater 404, instead of being directly connected to wireless base station 202, such as from information provided by wireless repeater 404 or from a configuration of the wireless device, without requiring modifications to the wireless device. For example, when additional synchronization signal block resources are allocated to wireless communication beam(s) of wireless repeater 404 during an initial access procedure, wireless base station 202 may acquire information on a link/wireless communication beam between wireless repeater 404 and second wireless device 108 based on a preamble reception on a synchronization signal block index assigned to wireless repeater 404. As particular embodiments of wireless base station 202 may utilize a synchronization signal block index of a preamble transmission for a candidate wireless communication beam selection for a wireless device, irrespective of whether wireless repeater 404 utilizes a single wireless communication beam or multiple wireless communication beams, it may be beneficial to determine whether the wireless device is directly or indirectly communicating with wireless base station 202 during an initial access procedure. For example, some embodiments of wireless base station 202 provide different respective preamble resources for each of (1) repeater-forwarded preambles associated with wireless repeater-specific synchronization signal resources and (2) normal preambles, i.e. preambles received by wireless base station 202 directly from a wireless device.

Side control information provided to wireless repeater 404, e.g., via configuration parameters 401, may vary according to desired operation of wireless repeater 404 with respect to supporting additional synchronization signal blocks. For example, side control information provided to wireless repeater 404 may include a list of synchronization signal block indexes (e.g., ssb-PositionsInBurst), a first subset of synchronization signal block indexes used for wireless base station 202 or one or more other wireless repeaters, a second set of synchronization signal block indexes for wireless repeater 404, and/or a beam pattern during the second set of synchronization signal block (or during the synchronization signal block indexes). Additionally, if wireless repeater 404 supports buffering, side control information provided to wireless repeater 404 may also indicate which synchronization signal block index(s) to buffer.

When a wireless repeater simply forwards all received data all the time (e.g., receive-forward from a wireless base station to wireless device(s) in a downlink slot and receive-forward from wireless device(s) to a base station), depending on the situation, this may increase interference at wireless device(s) or at wireless base station, or it may lead ambiguous situations. For example, when the repeater forwards a synchronization signal with a beam K to a wireless device, the wireless device may receive the synchronization signal from the wireless base station and the wireless repeater. The wireless device may determine a receiver beam based on the combined signal which may not correspond to the beam K, which may lead to an inaccurate spatial domain filter parameter of a preamble transmission from the wireless device and may impact successive operations. Similarly, when a wireless repeater forwards all received uplink data from wireless devices even though wireless devices are directly supported by the wireless base station, forwarded signals may interfere with uplink reception at the wireless base station. To avoid these undesirable interference situations, it would be desirable to inform a wireless repeater when to receive/forward to/from a wireless base station and/or wireless devices based on a slot format indicator.

Additionally, when side control information is sent to a wireless repeater, the wireless repeater is not supposed to forward the received side control information. To support this desired functionality, at least one new slot format indicator, to indicate resources where the repeater receives from the base station without forwarding, may be necessary.

Accordingly, particular embodiments of the new systems and methods disclosed herein are configured to support dynamic slot format indicators to further mitigate inference caused by use a wireless repeater in a wireless communication network. A dynamic slot format indicator may be used, for example, to schedule receiving and/or forwarding of wireless communication data by a wireless repeater. A dynamic slot format may also be used, for instance, to cause a wireless repeater to receive, but not forward, wireless communication data.

Figure 6:
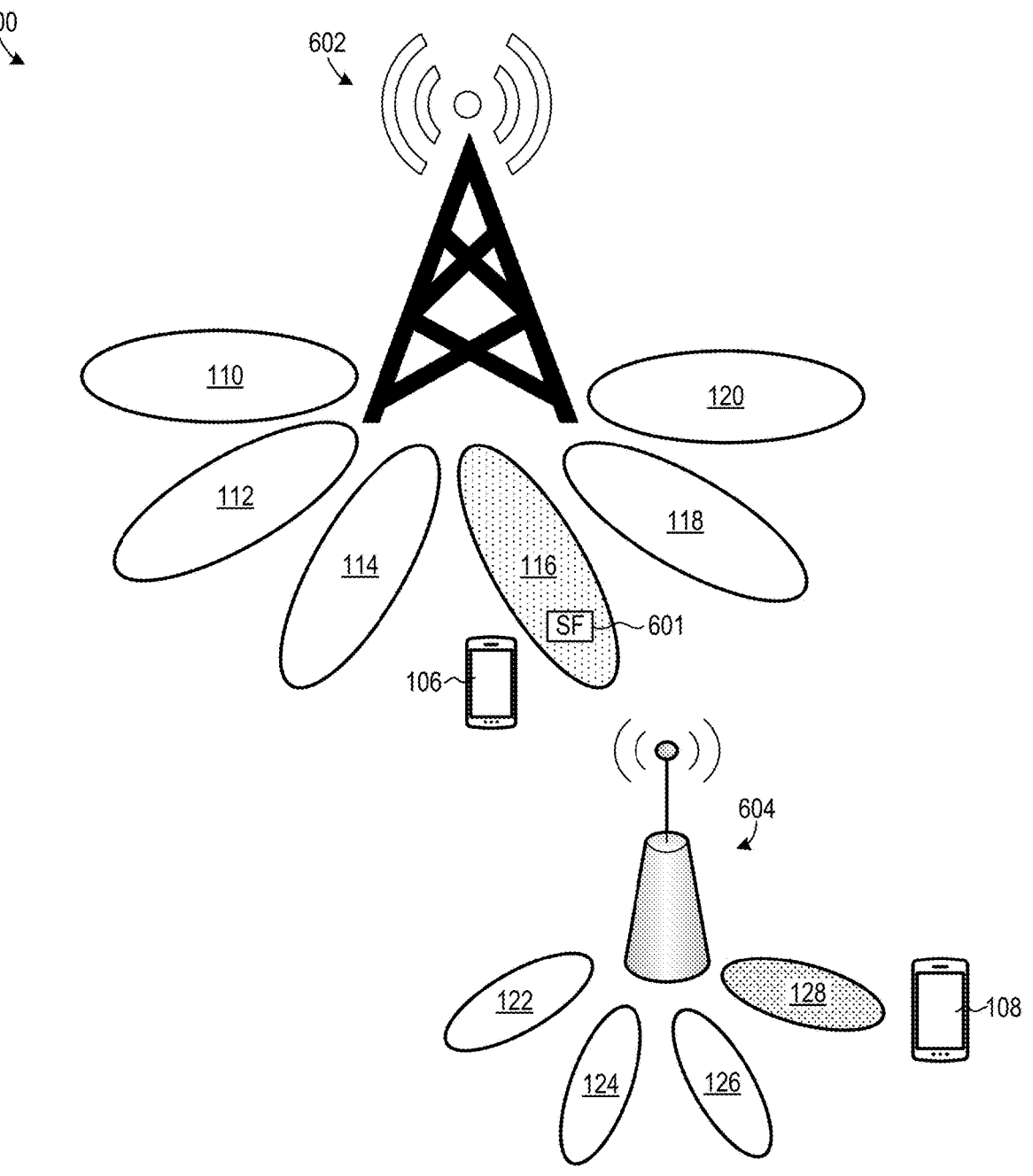
FIG. 6 is a block diagram of a wireless communication network configured to support dynamic signal slot indicators, according to an embodiment.

For example, FIG. 6 is a block diagram of a wireless communication network 600, which is similar to wireless communication network 100 (FIG. 1) but including a wireless base station 602 and a wireless repeater 604 in place of wireless base station 102 and wireless repeater 104, respectively. Wireless base station 602 is like wireless base station 102, but wireless base station 602 is configured to support dynamic signal slot indicators. Wireless base station 602 is optionally additionally configured to allocate additional initial access resources, e.g., additional synchronization signal blocks, to wireless repeater 604, such as in a manner analogous to that of wireless base station 202 of FIGS. 2 and 4. Wireless repeater 604 is like wireless repeater 104, but wireless repeater 604 is configured to (1) selectively forward wireless communication data received from wireless base station 602 to one or more wireless devices, (2) selectively store wireless communication data received from wireless base station 602, (3) selectively forward wireless communication data received from one or more wireless devices to wireless base station 602, and/or (4) selectively store wireless communication data received from one or more wireless devices, according to one or more dynamic slot format indicators (SF) received as side control information from wireless base station 602 via wireless communication beam 116. For example, in certain embodiments, synchronization signal block resources in a slot #n or a slot #p would be set via one or more dynamic slot format indicator to downlink resources without forwarding. In response thereto, wireless repeater 604 may receive synchronization signal transmissions in slot #n or slot #p, but wireless repeater 604 would not forward the data of slot #n or slot #p.

In some embodiments, wireless base station 602 generates dynamic slot format indicators 601, while in some other embodiments, dynamic slot format indicators 601 are at least partially generated external to wireless base station 602, e.g., at a core network (not shown) of wireless communication network 600. Particular embodiments of wireless repeater 604 are configured to address each received data structure, e.g., each received orthogonal frequency division multiplexing (OFDM) symbol in embodiments of wireless communication network 600 supporting OFDM data transmission, according to a respective dynamic slot format indicator 601. For example, wireless repeater 604 may address a given received data structure, such as an OFDM symbol, according to one of the following procedures, as specified by a corresponding one or more dynamic slot format indicators: (1) receive and forward downlink wireless communication data from wireless base station 602 to one or more wireless devices, (2) receive downlink wireless communication data from wireless base station 602 but do not forward the wireless communication data, (3) receive and forward uplink wireless communication data from one or more wireless devices to wireless base station, (4) receive uplink wireless communication data from one or more wireless devices but do not forward the wireless data, or (5) do not receive wireless communication data, or stated differently, operate in an "off" state.

Dynamic slot format indicators 601 may be advantageously used to prevent or delay wireless repeater 604 from forwarding wireless communication data that may cause interference if wireless repeater 604 were to immediately forward the wireless communication data. For example, dynamic slot format indicators 601 may be used to prevent wireless repeater 604 from forwarding side control information and/or data associated with wireless devices directly connected to wireless base station 602. In particular embodiments, a dynamic slot format indicator 601 may be also used to control at what time wireless repeater 604 forwards wireless communication data associated with the dynamic slot format indicator 601, such as to cause wireless repeater 604 to forward beam-swept synchronization signal blocks at a different time than wireless base station 602.

As one example of operation of wireless repeater 604, in an embodiment, wireless repeater 604 receives one or more first dynamic slot format indicators 601 from wireless base station 602, and wireless repeater 604 receives first wireless communication data from wireless base station 602 via wireless communication beam 116. Wireless repeater 604 determines from the one or more first dynamic slot format indicators 601 that the first wireless communication data is to be forwarded, and in response thereto, wireless repeater 604 forwards the first wireless communication data to one or more wireless communication nodes, e.g., to second wireless device 108. Additionally, wireless repeater 604 receives one or more second dynamic slot format indicators 601 from wireless base station 602, and wireless repeater 604 receives second wireless communication data from wireless base station 602 via wireless communication beam 116. Wireless repeater 604 determines from the one or more second dynamic slot format indicators 601 that the second wireless communication data is to be stored, and in response thereto, wireless repeater 604 stores the second wireless communication data.

Figure 7:
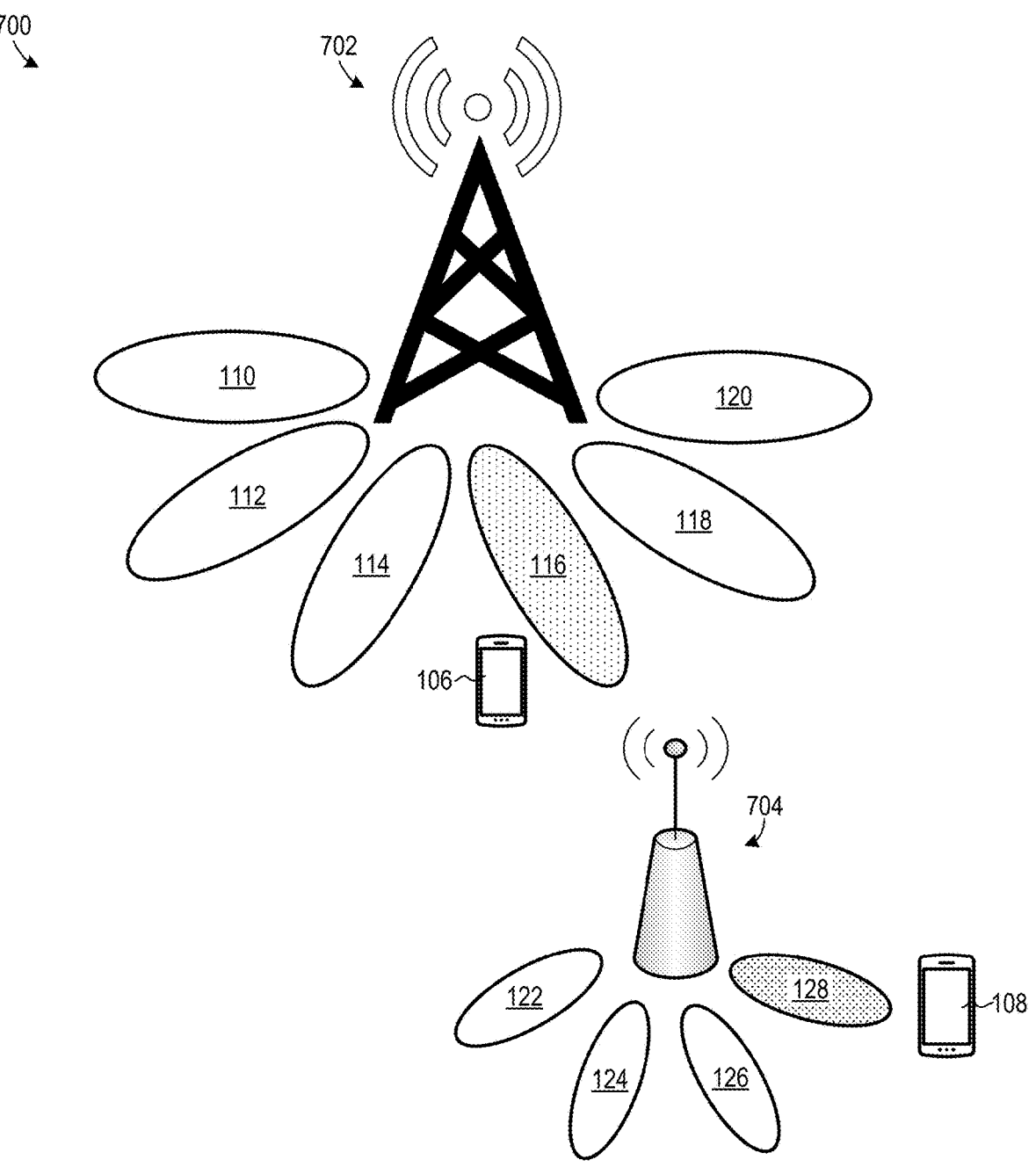
FIG. 7 is a block diagram of a wireless communication network including random access resources dedicated to a wireless repeater, according to an embodiment.

FIG. 7 is a block diagram of a wireless communication network 700, which includes another embodiment of the new systems for initial access in a communication network including a wireless repeater. Wireless communication network 700 is similar to wireless communication network 100 (FIG. 1) but includes a wireless base station 702 and a wireless repeater 704 in place of wireless base station 102 and wireless repeater 104, respectively. Wireless base station 702 is configured to allocate one or more separate or dedicated initial access resources to one or more of wireless communication beams 112-128 of wireless repeater 704. Certain embodiments of wireless base station 702 use a common set of synchronization signal block resources for synchronization signal block transmissions from both of wireless base station 702 and wireless repeater 704. Additionally, wireless base station 702 may configure additional preamble resources and/or random access resources for wireless repeater 704.

Figure 8:
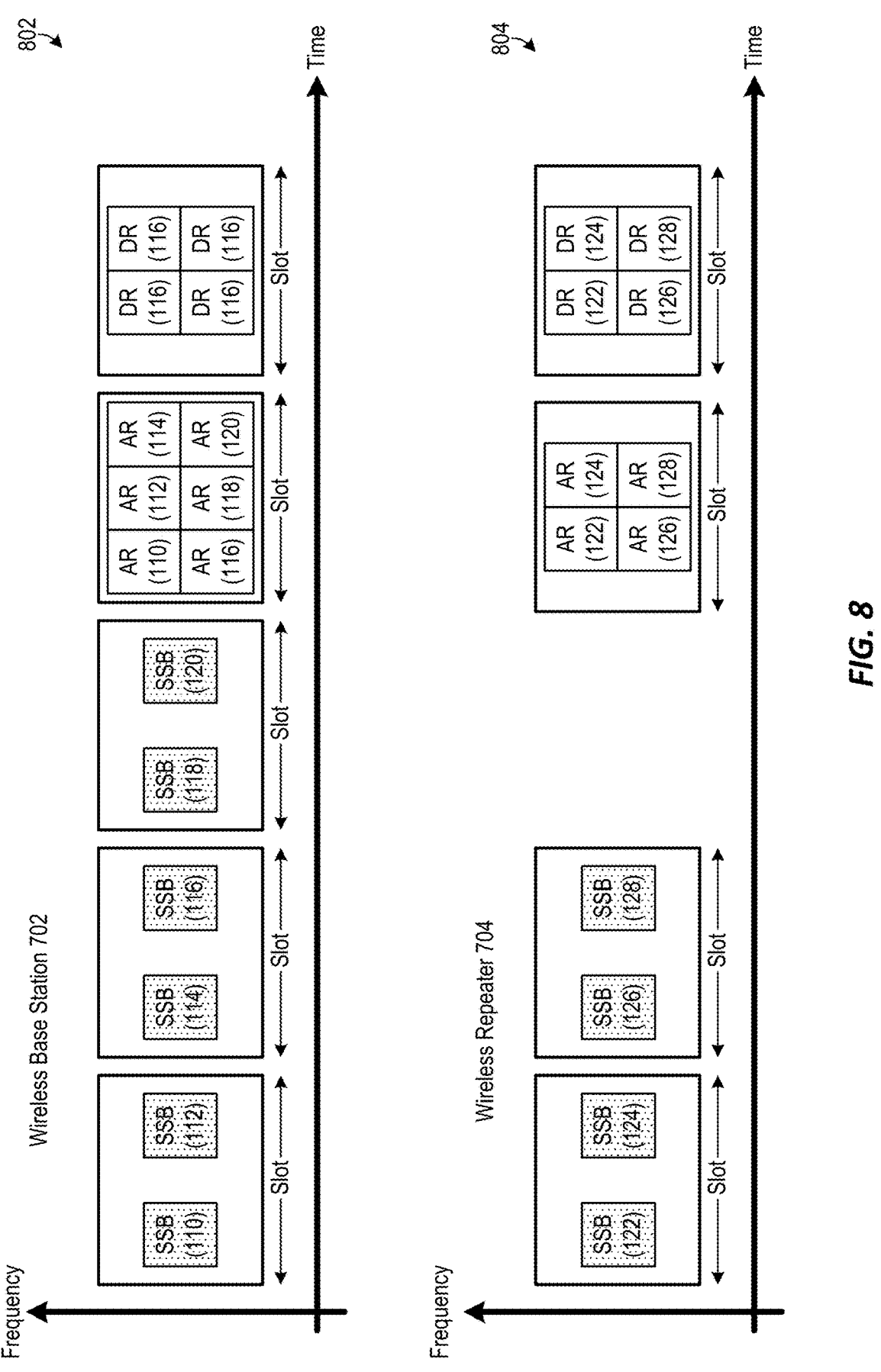
FIG. 8 includes two graphs illustrating one example of initial access resource configuration in the FIG. 7 wireless communication network.

For example, FIG. 8 includes two graphs 802 and 804 illustrating one example of an initial access resource configuration in wireless communication network 700. Graph 802 is of wireless base station 702 resources in frequency versus time, and graph 804 is of wireless repeater 704 resources in frequency versus time. Each of graphs 802 and 804 includes transmitted synchronization signal blocks, symbolically shown as a shaded boxes, with respective beam indexes shown in parenthesis. In particular, graph 802 includes transmitted synchronization signal blocks with respective beam indexes corresponding to wireless communication beams 110-120. Additionally, graph 804 includes transmitted synchronization signal blocks with respective beam indexes corresponding to wireless communication beams 122-128. Each of graphs 802 and 804 further includes random access resources (AR) associated with a respective synchronization signal block or a beam index shown in parenthesis. Each of graphs 802 and 804 additionally includes random access resources (DR) dedicated to wireless repeater 704, where each dedicated random access resource is associated with a respective synchronization signal block or beam index shown in parenthesis.

Particular embodiments of wireless base station 702 are configured to allocate dedicated resources DR to wireless repeater 704 via dedicated/repeater-specific signaling. In some embodiments, dedicated resources DR allocated to wireless repeater 704 are not known to wireless devices, such as first wireless device 106 and second wireless device 108, in wireless communication network 700. For example, in certain embodiments, dedicated resources DR allocated to wireless repeater 704 are not broadcasted via system information block or signaling to wireless devices of wireless communication network 700.

Referring again to FIG. 7, in certain embodiments, when wireless repeater 704 receives one or more preambles from one or more wireless devices served by wireless repeater

704, wireless repeater 704 may store the one or more preambles. Wireless repeater 704 may amplify and forward the one or more preambles via dedicated random access resources DR. For instance, dedicated random access resources DR may include a plurality of resources where one or more of the resources corresponds to a synchronization signal block index, or a synchronization signal block beam, of wireless repeater 704. Wireless repeater 704 may utilize the one or more resources for forwarding a preamble that wireless repeater 704 receives via, or based on, a synchronization signal block index, or a synchronization signal block beam, of wireless repeater 704. For example, wireless repeater 704 may receive a preamble from second wireless device 108 via a random access resources AR associated with wireless communication beam 128, and wireless repeater 704 may forward the preamble to wireless base station 702 using random access resources DR allocated to wireless communication beam 128, thereby helping wireless base station 702 acquire candidate beam information for second wireless device 108.

In certain embodiments, wireless base station 702 may configure a RACH resource corresponding to each of a plurality of wireless communication beams, or to each of a plurality synchronization signal block indexes, of wireless repeater 704. Wireless repeater 704 may forward a preamble that is based one of the aforementioned wireless communication beams or synchronization signal block indexes. Wireless repeater 704 may be configured such that if wireless repeater 704 receives more than one preamble corresponding to the RACH resource, wireless repeater 704 may select one of the preambles, or wireless repeater 704 may combine the preambles and transmit the preambles to wireless base station 702 via combined signaling.

Wireless communication network 700 may scale to support additional wireless repeaters by dedicating additional resources for each additional wireless repeater supported by wireless base station 702.

In certain embodiments of wireless communication network 700, wireless repeater 704 may receive a synchronization signal block in a synchronization signal block burst index I, and wireless repeater 704 may repeat, i.e., transmit, the synchronization signal block in a next synchronization signal block burst index i+1 even though wireless repeater 704 does not receive the synchronization signal block again. Some embodiments of wireless repeater 704 are configured to amplify and forward synchronization signal blocks associated with a candidate wireless communication beam, to prevent amplification and forwarding of poor quality received synchronization signal blocks. Wireless base station 702 may transmit synchronization signal blocks to wireless repeater 704 either periodically or aperiodically.

Some embodiments of wireless communication network 700 are further configured to support dynamic slot format indicators, such as for controlling handling of received data structures by wireless repeater 704. Wireless base station 702 may provide dynamic slot format indicators, for example, using radio resource control (RRC) signaling, higher or dedicated signaling, or dynamic control information (DCI) via Layer 1 signaling. Certain embodiments of wireless base station 702 are configured to (1) configure a first dynamic slot format indicator for a first communication link between wireless base station 702 and wireless repeater 704, such as via wireless communication beam 116, and (2) configure a second dynamic slot format indicator for a second communication link between wireless repeater 704 and one or more wireless devices e.g., for a communication link between wireless repeater 704 and second wireless device 108 via wireless communication beam 128.

For example, wireless base station 702 may configure a first slot format indicator indicating that slot #i/slot #i+1/slot #i+2 are reserved. Wireless base station 702 may additionally configure a second slot format indicator indicating that slot #i/slot #i+1/slot #i+2 are downlink (or for access to one or more wireless devices). The first slot format indicator may indicate slot #i+4 (where random access resources are configured) as being reserved, as wireless base station 702 may not expect to receive any wireless data forwarded from wireless repeater 704 during the slot #i+4. The second slot format indicator may indicate that slot #i+4 is uplink and that slot #i+5 is reserved.

In particular embodiments, wireless repeater 704 is configured to forward stored wireless data of a slot to one or more wireless devices in response to (1) a first dynamic slot indicator for the first communication link indicating that the slot is reserved and (2) a second dynamic slot indicator for the second communication link indicating that the slot is communication link indicating that the slot is allocated to downlink and (2) a second dynamic slot indicator for the second communication link indicating that the slot is reserved.

Table 1 below illustrates one possible response of wireless repeater 704 to a pair of dynamic slot format indicators SF1 and SF2, where (1) SF1 is a first dynamic slot indicator for a first communication link between wireless base station 702 and wireless repeater 704, such as via wireless communication beam 116, (2) SF2 is a second dynamic slot format indicator for a second communication link between wireless repeater 704 and one or more wireless devices, e.g., for a communication link between wireless repeater 704 and second wireless device 108 via wireless communication beam 128, (3) D represents downlink, (4) U represents uplink, and (5) R represents reserved. For example, "D, R" indicates that the first communication link is allocated to downlink and the that second communication link is reserved. As another example, "R, U" indicates that the first communication link is reserved and the second communication link is for uplink.

TABLE 1

| SF1, SF2 | Wireless Repeater 704 Response |
|---|---|
| D, D | Receive a signal from wireless base station 702 based on a first candidate wireless communication beam determined for the first communication link, amplify the received signal, and transmit the signal to one or more wireless devices via a second candidate wireless communication beam configured by wireless base station 702, or via a wireless communication beam determined by wireless repeater 704, substantially instantaneously. |
| D, R | Receive a signal from wireless base station 702, amplify the signal, and store the signal in a transmitter buffer. |
| R, D | Do not receive a signal, and transmit a signal stored in the transmitter buffer to one or more wireless devices. |
| R, R | Do not receive a signal, and do not transmit a signal. |
| U, U | Receive a signal from a wireless device via the second candidate wireless communication beam configured by wireless base station 702, or via the wireless communication beam determined by wireless repeater 704, amplify the signal, and transmit the signal to wireless base station 702, substantially instantaneously. |
| R, U | Receive a signal from a wireless device via the second candidate wireless communication beam configured by wireless base station 702, or via the wireless communication beam determined by wireless repeater 704, amplify the signal, and store the signal in a receiver buffer. |
| U, R | Do not receive a signal, and transmit a signal stored in the receiver buffer to wireless base station 702. | configured for downlink. More generally, certain embodiments of wireless repeater 704 may be configured to forward stored wireless data of a slot in response to (1) first time and frequency sources R1 for the first communication link being reserved and (2) second time and frequency sources R2 for the second communication link being allocated to downlink. Wireless base station 702 may configure a stored slot or stored data, or wireless repeater 704 may acquire the stored slot or the stored data. The stored slot or the stored data includes, for example, a synchronization signal block, a system information block, and/or any other non-dynamic or relatively semi-static data configured and transmitted by wireless base station 702.

Some embodiments of wireless repeater 704 are configured to forward a stored slot, or a stored resource, for uplink in response to (1) a first dynamic slot indicator for the first communication link indicating that the slot is allocated to uplink and (2) a second dynamic slot indicator for the second communication link indicating that the slot is reserved. Additionally, certain embodiments of wireless repeater 704 are configured to store data received via a slot or resource in response to (1) a first dynamic slot indicator for the first Certain embodiments of wireless base station 702 are configured to determine a set of synchronization signal blocks based on a maximum number of (1) a first set of beams, i.e., wireless communication beams supported by wireless base station 702, and (2) a second set of beams, i.e., wireless communication beams supported by wireless repeater 704. For example, wireless base station 702 may determine a set of synchronization signal blocks including a quantity of synchronization signals blocks equal to the larger of (1) quantity of beams in the first set of beams and (2) quantity of beams in the second set of beams. In embodiments of wireless communication network 100 including a plurality of wireless repeaters, wireless base station 702 may determine a set of synchronization signal blocks including a quantity of synchronization signals blocks equal to the largest quantity of synchronization signal blocks supported by any wireless repeater or wireless base station 702.

Figure 9:
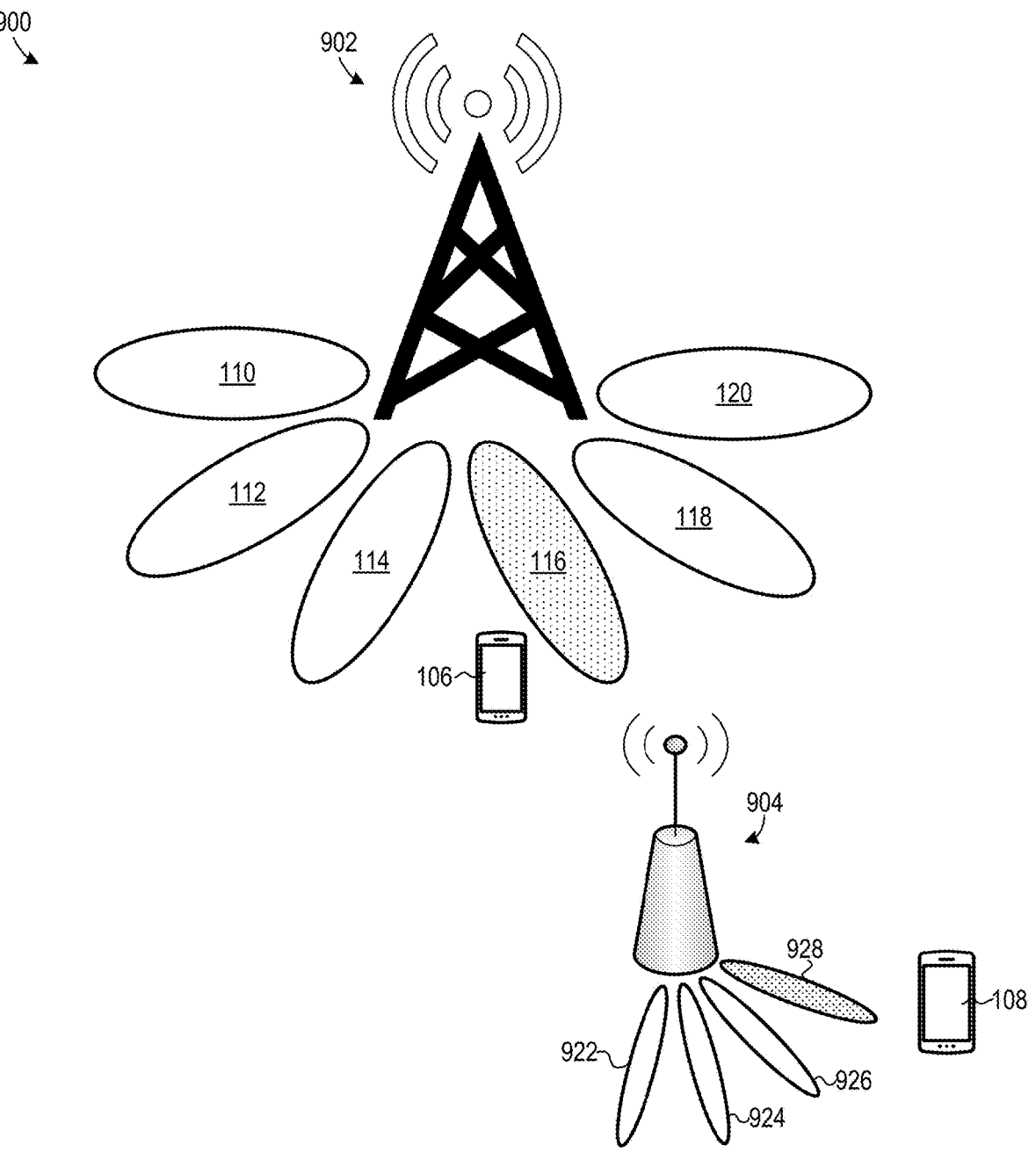
FIG. 9 is a block diagram of a wireless communication network including a wireless repeater configured to generate digital wireless communication beams, according to an embodiment.

FIG. 9 is a block diagram of wireless communication network 900, which includes another embodiment of the new systems for initial access in a communication network including a wireless repeater. Wireless communication network 900 is similar to wireless communication network 100

(FIG. 1) but includes a wireless base station 902 and a wireless repeater 904 in place of wireless base station 102 and wireless repeater 104, respectively. Wireless repeater 904 is configured to cover an analog wireless communication beam from wireless base station 902, e.g., wireless communication beam 116, and wireless repeater 904 is configured to generate four digital wireless communication beams 922-928 which are finer than analog wireless communication beams. Second wireless device 108 is connected to wireless base station 902 via wireless communication beam 928, wireless repeater 904, and wireless communication beam 116, in wireless communication network 900.

In particular embodiments, second wireless device 108 is associated with wireless repeater 904 only after initial access via dedicated signal between wireless repeater 904 and second wireless device 108. In these embodiments, wireless base station 902 is configured to designate one or more OFDM symbols (or other data structures) and resources used for initial access as being reserved, and wireless repeater 904 therefore does not forward initial access related signals, such as synchronization signal blocks, preambles, etc.

Figure 10:
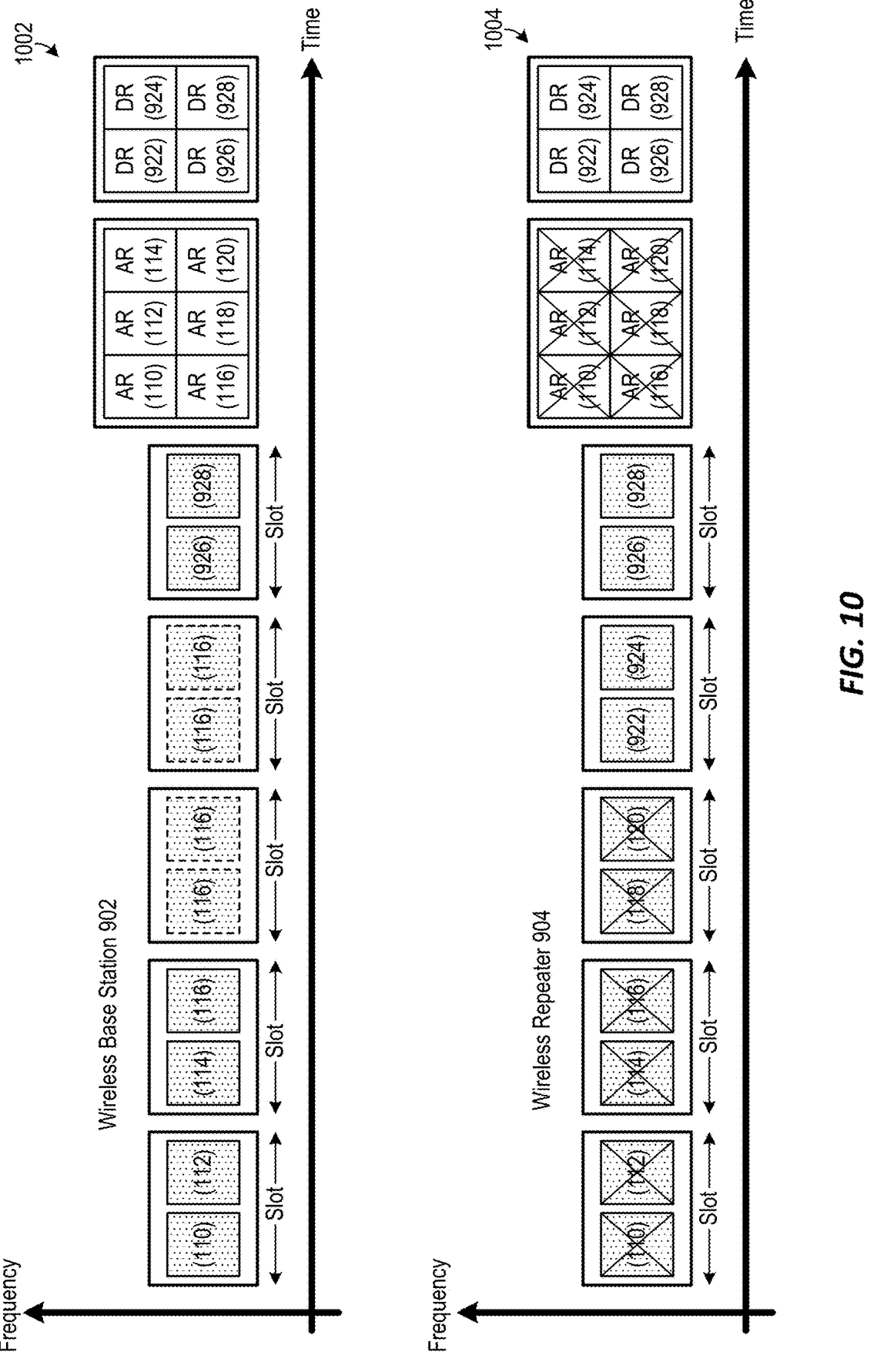
FIG. 10 includes two graphs illustrating one example of initial access resource configuration in the FIG. 9 wireless communication network.

FIG. 10 includes two graphs 1002 and 1004 illustrating one example of an initial access resource configuration in wireless communication network 900. Graph 1002 is of wireless base station 902 resources in frequency versus time, and graph 1004 is of wireless repeater 904 resources in frequency versus time. Each of graphs 1002 and 1004 includes transmitted synchronization signal blocks, symbolically shown as a shaded boxes, with respective beam indexes shown in parenthesis. In particular, graph 1002 includes transmitted synchronization signal blocks with respective beam indexes corresponding to wireless communication beams 110-120. Additionally, graph 1004 includes transmitted synchronization signal blocks with respective beam indexes corresponding to wireless communication beams 922-928. It should be noted that transmitted synchronization signal blocks associated with wireless base station 902 are reserved from the perspective of wireless repeater 904, as symbolically shown by an "X" through each of the corresponding boxes in graph 1004. Wireless base station 902 optionally further allocates synchronization signal resources for each wireless communication beam of wireless repeater 904, as symbolically shown in graph 1002 as shaded boxes with dashed line outlines and beam indexes corresponding to wireless communication beam 116.

Each of graphs 1002 and 1004 further includes random access resources AR associated with a respective synchronization signal block or a beam index shown in parenthesis. However, random access resources AR associated with wireless communication beams of wireless base station 902 are reserved from the perspective of wireless repeater 904, as symbolically shown by an "X" through each of the corresponding boxes in graph 1004. Each of graphs 1002 and 1004 additionally includes random access resources DR dedicated to wireless repeater 904, where each dedicated random access resource is associated with a respective synchronization signal block or a beam index shown in parenthesis.

Referring again to FIG. 9, wireless base station 902 may allocate additional resources of wireless communication beams 922-928 of wireless repeater 904. Wireless base station 902 may transmit some synchronization signal blocks to wireless repeater 904 via wireless communication beam 116, and wireless base station 902 may not transmit other synchronization signal blocks to wireless repeater 904. For example, wireless base station 902 may allocate resources associated with synchronization signal blocks of wireless communication beams 110-120 as being reserved, such that wireless repeater 904 does not receive or transmit data associated with these particular synchronization signal bocks. As another example, wireless base station 902 may (1) configure resources associated with a synchronization signal block of wireless communication beam 116 as downlink for a first communication link between wireless base station 902 and wireless repeater 904, (2) reserve a second communication link between wireless repeater 904 and one or more wireless device, e.g., second wireless device 108, such that wireless repeater 904 receives the synchronization signal block and stores it for future forwarding.

Particular embodiments of wireless base station 902 may configure resources for wireless communication beams 922-928 as being reserved for the first communication link so that wireless repeater 904 does not receive a signal unless wireless base station 902 is transmitting wireless data, e.g., a synchronization signal block, via wireless communication beam 116. Wireless base station 902 may configure the resources for wireless communication beams 922-928 as downlink for the second communication link, with one or more configured beams and/or spatial domain filter parameters.

When wireless base station 902 does not transmit a synchronization signal block with wireless communication beam 116, resources may be available for other downlink transmissions or uplink transmissions. Conventionally, a wireless base station may indicate available resources via ssb-PositionsInBurst (e.g., indicating SSB index in ssb-PositionsInBurst), and a wireless device may assume that such resources are not being used for downlink or uplink. For example, a DCI may indicate whether resources configured for SSB in ssb-PositionsInBurst are not being used for downlink. In another example, a RRC or Wireless device dedicated may indicate whether resources in ssb-PositionsInBurst are not being used for downlink.

Some embodiments of wireless base station 902 are configured to override ssb-PositionsInBurst by dedicated signaling to one or more wireless device where the one or more wireless device may consider the dedicated signaling as higher priority than ssb-PositionsInBurst. For example, the dedicated signaling may indicate that there are no synchronization signal blocks with synchronization signal block indexes corresponding to wireless communication beams 922-928 (shown as shaded boxes with dashed line outlines in FIG. 10). In response thereto, a wireless device may assume that these resources may be used for downlink and/or uplink.

Similarly, particular embodiments of wireless base station 902 are configured to indicate that RACH resources corresponding to synchronization signal block indexes of wireless base station 902 (corresponding to wireless communication beams 110-120) are reserved from the perspective of wireless repeater 904, so that wireless repeater 904 does not forward data using these resources. However, wireless repeater 904 may receive preambles for RACH resources corresponding to synchronization signal block indexes associated with wireless communication beams 922-928, and wireless repeater 904 may forward these preambles to wireless base station 902 via wireless communication beam 116.

Certain embodiments of wireless base station 902 are configured to identify to each wireless repeater a set of synchronization signal blocks that are allocated to the wireless repeater. Each wireless repeater may be configured to assume that each other synchronization signal block and associated random access resources are reserved and therefore unavailable to the wireless repeater.

Figure 11:
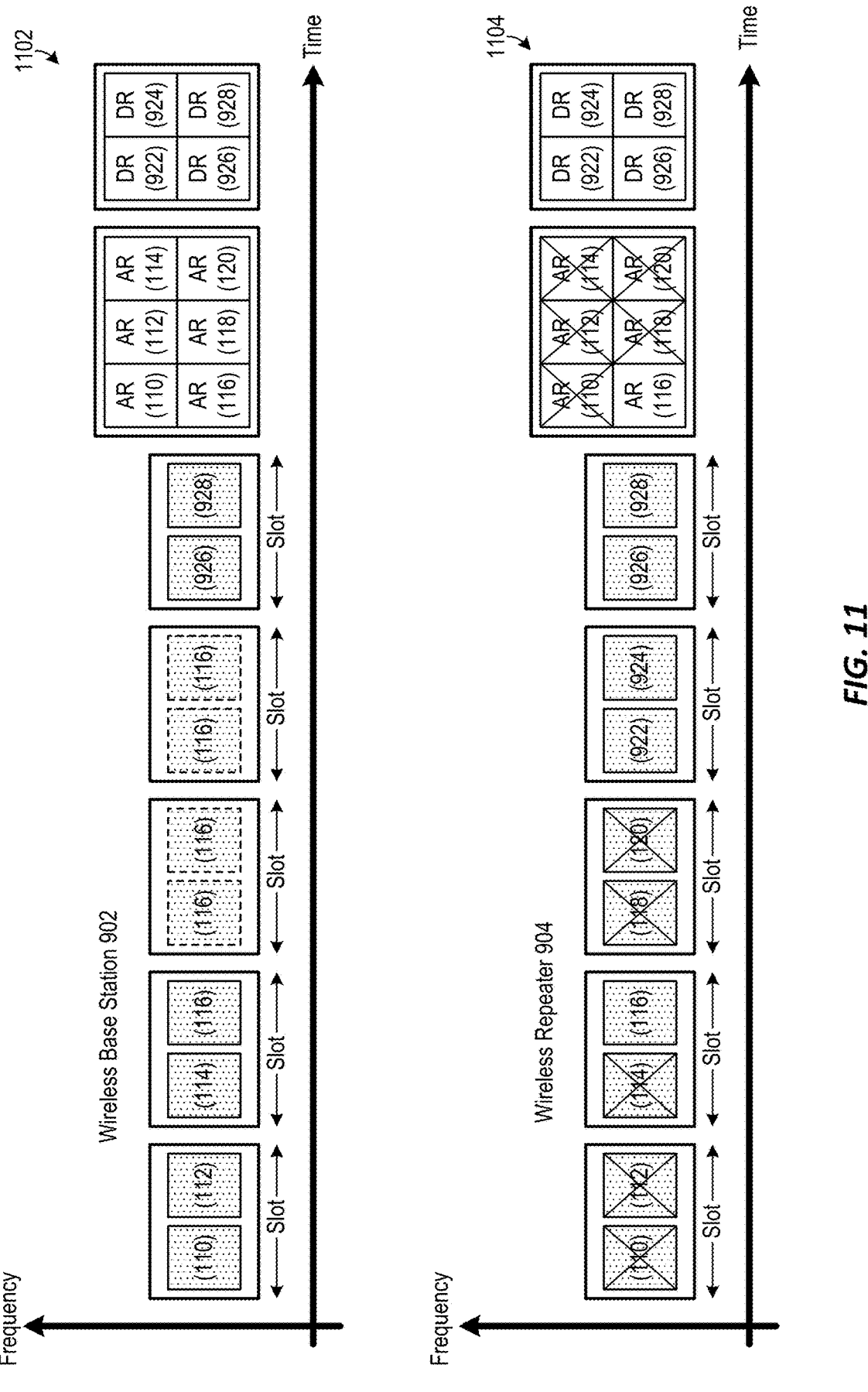
FIG. 11 includes two graphs illustrating another example of initial access resource configuration in the FIG. 9 wireless communication network.

FIG. 11 includes two graphs 1102 and 1104 illustrating another example of an initial access resource configuration in wireless communication network 900 where wireless repeater 904 uses resources of a candidate wireless communication beam, i.e., wireless communication beam 116 during initial access. Graphs 1102 and 1104 of FIG. 11 are the same as graphs 1002 and 1004 of FIG. 10, respectively, except that the transmitted synchronization symbol block associated with wireless communication beam 116, as well as the random access resources AR associated with wireless communication beam 116, are not designated as being reserved.

Figure 12:
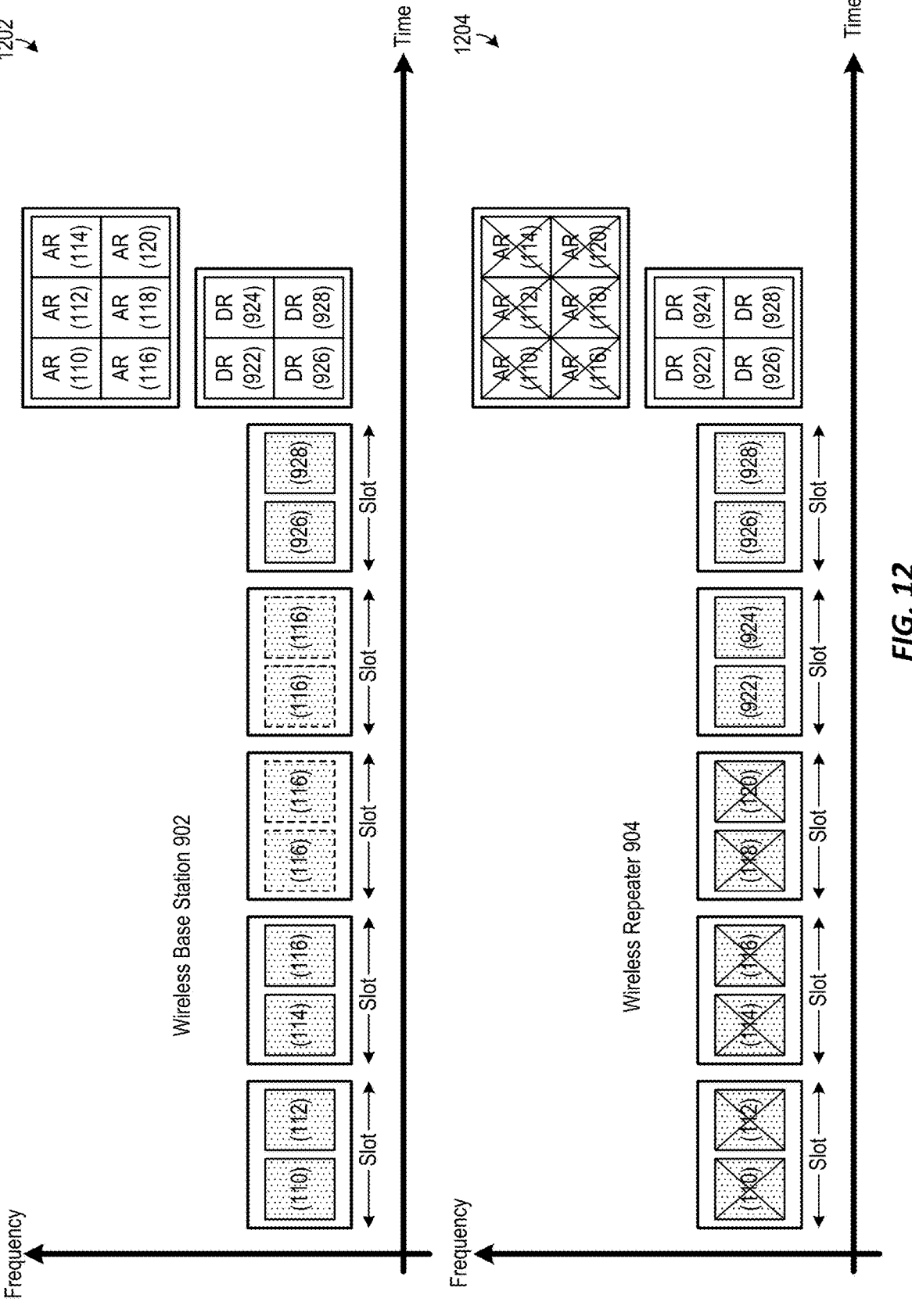
FIG. 12 includes two graphs illustrating another example of initial access resource configuration in the FIG. 9 wireless communication network.

In certain embodiments, random access resources DR dedicated to wireless repeater 904 may encompass a different time and/or frequency range than random access resources AR. For example, dedicated random access resources for wireless repeater 904 may be the same RACH resources as those broadcasted from a system information block (SIB) of wireless base station 902, but with a frequency offset of f0. As another example, dedicated random access resources for wireless repeater 904 may be the same RACH resources as those broadcasted from a SIB of wireless base station 902, but with a time offset of t0. FIG. 10, discussed above, illustrates an example of how random access resources DR dedicated to wireless repeater 904 may encompass a different time range than random access resources AR. FIG. 12 illustrates one example of how random access resources DR dedicated to wireless repeater 904 may encompass a different frequency range than random access resources AR. FIG. 12 includes graphs 1202 and 1204 which are analogous to graphs 1002 and 1004 of FIG. 10, but where random access resources DR dedicated to wireless repeater 904 may encompass a different frequency range than random access resources AR.

Some embodiments of wireless repeater 904 are configured to shift frequency of a received signal and subsequently transmit the signal in an appropriate slot. For example, if two resources are separated by f0, wireless repeater 904 may shift frequency of the received signal by f0 and the transmit the signal. Wireless repeater 904 may or may not amplify the received signal. The bandwidth of wireless repeater 904 may be limited so that the frequency shifted signal does not extend beyond a carrier's frequency.

Figure 13:
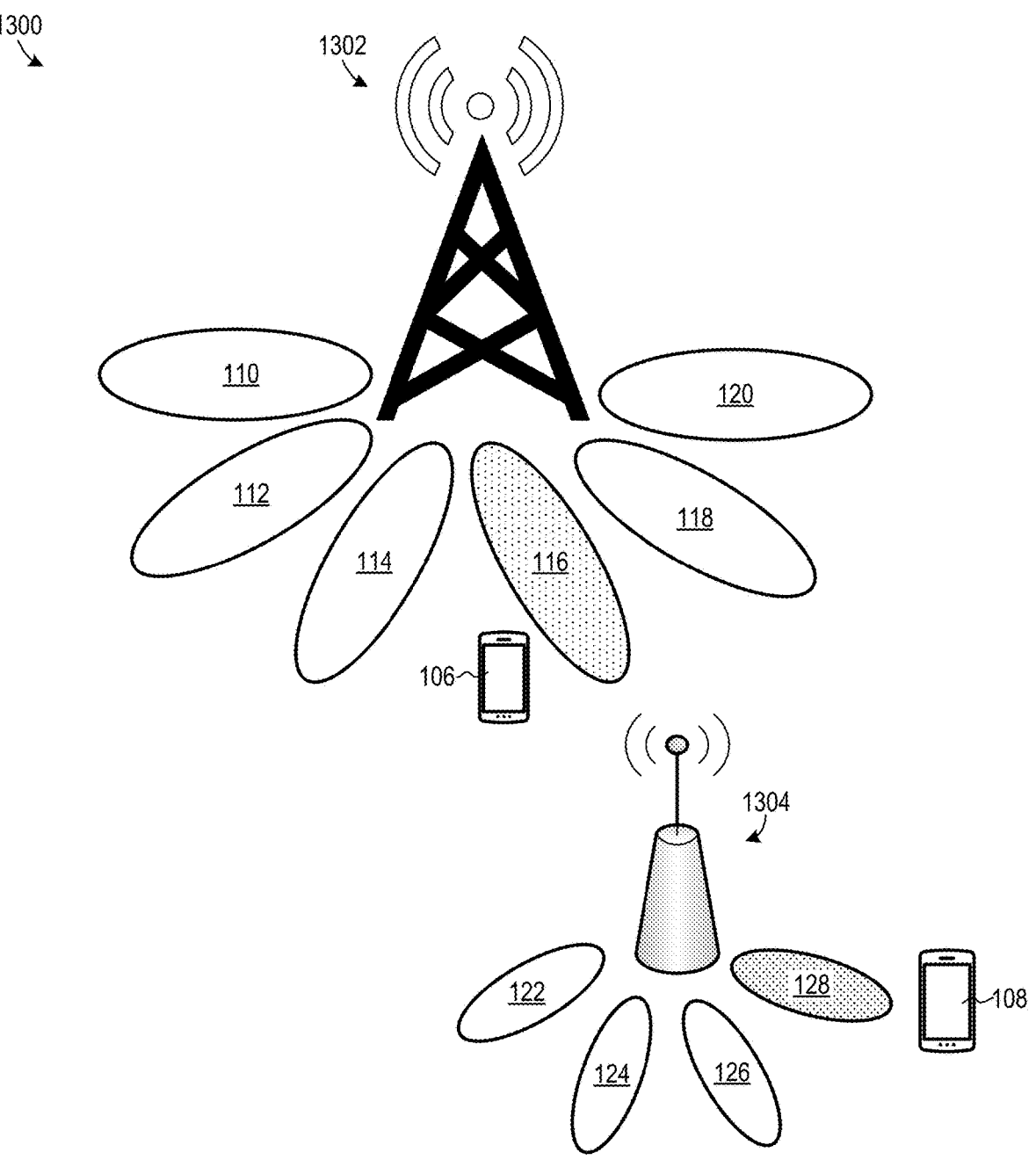
FIG. 13 is a block diagram of a wireless communication network where a wireless base station and a wireless repeater operate on a common set of wireless communication beams.

FIG. 13 is a block diagram of a wireless communication network 1300, which includes another embodiment of the new systems for initial access in a communication network including a wireless repeater. Wireless communication network 1300 is similar to wireless communication network 100 (FIG. 1) but includes a wireless base station 1302 and a wireless repeater 1304 in place of wireless base station 102 and wireless repeater 104, respectively. Wireless base station 1302 and wireless repeater 1304 operate with a common set of wireless communication beams (e.g., a common set of analog wireless communication beams or a common set of spatial domain filter parameters). For example, wireless communication beam 110 of wireless base station 1302 may correspond to a common set of spatial domain filter parameter of wireless communication beam 122 of wireless repeater 1304. As another example, wireless communication beam 112 of wireless base station 1302 may correspond to a common set of spatial domain filter parameter of wireless communication beam 124 of wireless repeater 1304. Wireless base station 1302 uses candidate wireless communication beam 116 to transmit wireless communication data between wireless base station 1302 and wireless repeater 1304.

Figure 14:
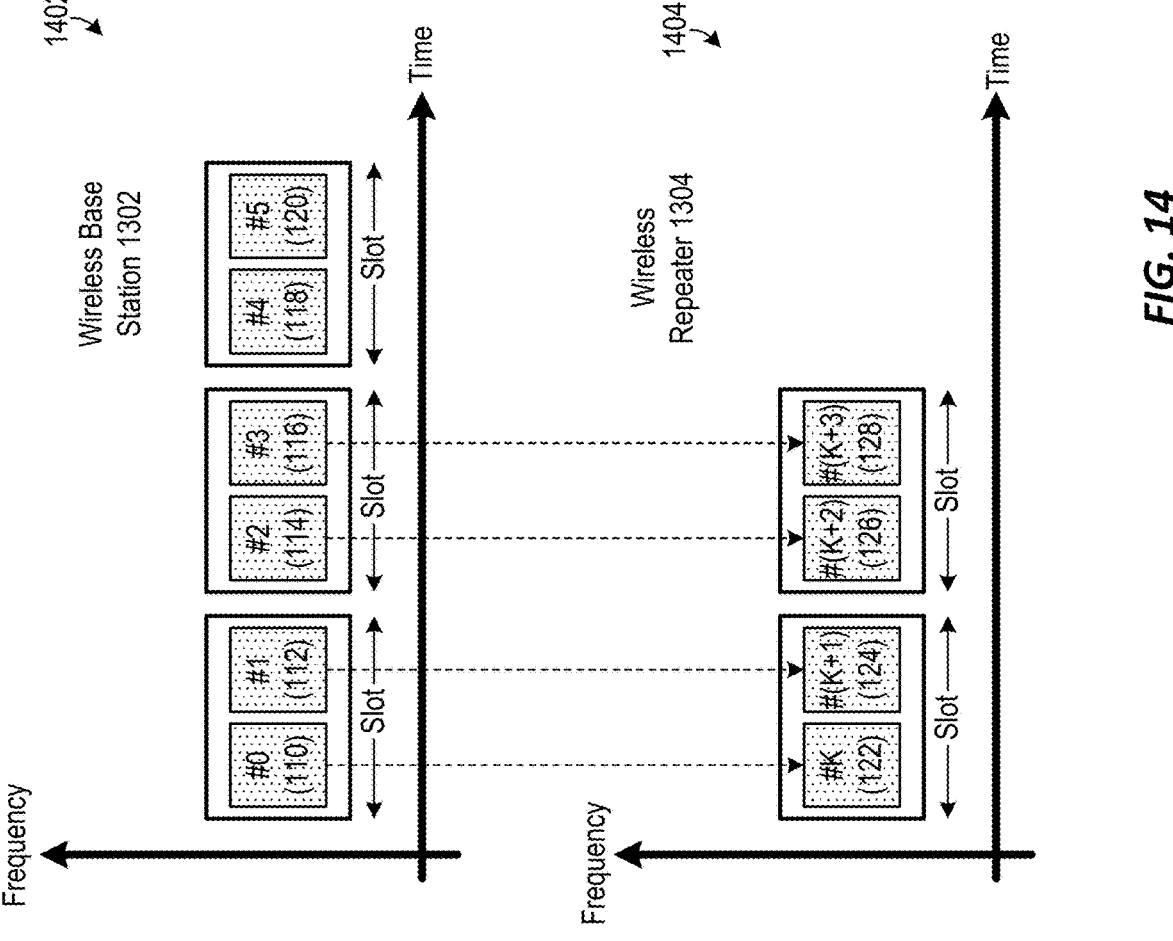
FIG. 14 includes two graphs illustrating one example of initial access resource configuration in the FIG. 13 wireless communication network.

FIG. 14 includes two graphs 1402 and 1404 illustrating one example of an initial access resource configuration in wireless communication network 1300. Graph 1402 is of wireless base station 1302 resources in frequency versus time, and graph 1404 is of wireless repeater 1304 resources in frequency versus time. Each of graphs 1402 and 1404 includes transmitted synchronization signal blocks, symbolically shown as a shaded boxes, with respective beam indexes shown in parenthesis. In particular, graph 1402 includes transmitted synchronization signal blocks with respective beam indexes corresponding to wireless communication beams 110-120. Additionally, graph 1404 includes transmitted synchronization signal blocks with respective beam indexes corresponding to wireless communication beams 122-128.

In the example of FIG. 14, wireless base station transmits one or more first synchronization signal blocks via one or more first resources based on a first set of beams, a first set of spatial domain filter parameters, and/or a first set of antenna array patterns/parameters. Wireless repeater 1304 may transmit one or more second synchronization signal blocks via one or more second resources based on a second set of beams, a second set of spatial domain filter parameters, and/or a second set of antenna array patterns/parameters. In this example, the one or more first resources may be equivalent to the one or more second resources. In this example, the one or more first resources may be a superset of the one or more second resources. A resource may be represented as a frequency and time domain resource element (e.g., time/frequency resource) in the FIG. 13 example.

The approach of FIGS. 13 and 14 may advantageously achieve low overhead as no additional resource for synchronization signal block(s) of the wireless repeater may be necessary. The wireless base station may utilize a same set of resources for synchronization signal blocks and/or preamble resources regardless of whether the wireless base station has one or more repeaters or not. This approach, however, may provide ambiguity and/or performance degradation in initial access of a wireless device. As such, one or more of the other embodiments discussed above may achieve better performance.

While the new systems and methods are discussed above primarily in the context of 3GPP-based wireless communication networks, the new systems and methods are not limited to 3GPP-based applications, and the new systems and methods could applied to other types of wireless communication networks, including but not limited to, Wi-Fi wireless communication networks (e.g., based on an Institute of Electrical and Electronics Engineers (IEEE) 802.11 standard), satellite wireless communication networks (e.g., using very low earth orbit (VLEO) satellites, low earth orbit (LEO) satellites, medium earth orbit (MEO) satellites, or geostationary equatorial orbit (GEO) satellites), Bluetooth wireless communication networks, long range (LoRa) wireless communication networks, Zigbee wireless communication networks, Z-Wave wireless communication networks, or Wi-Fi direct wireless communication networks. Additionally, the new systems and methods could be applied to wireless communication networks using a plurality of wireless communication protocols.

Figure 15:
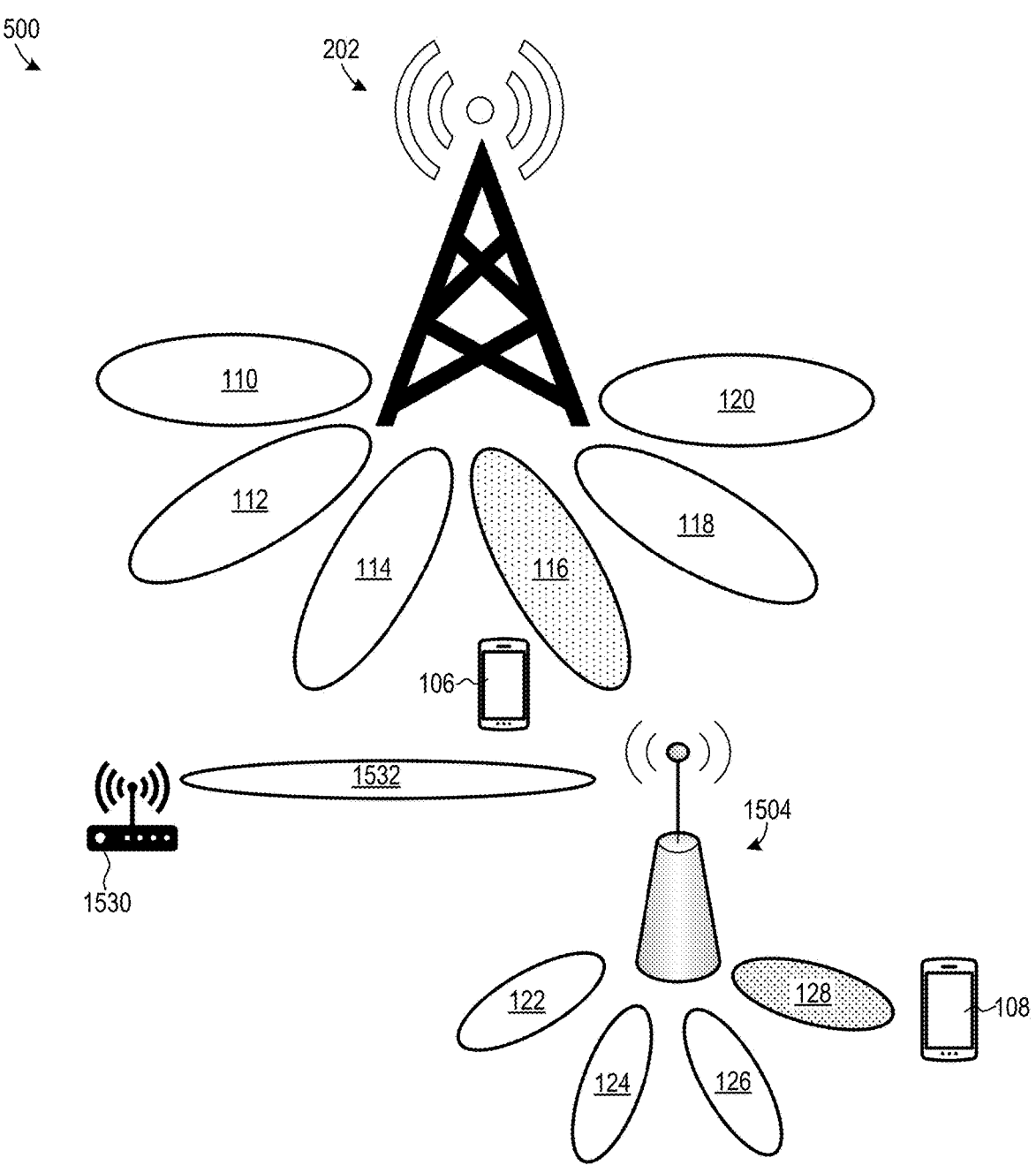
FIG. 15 is a block diagram of an alternate embodiment of the FIG. 2 wireless communication network further including a Wi-Fi wireless base station.

For example, FIG. 15 is a block diagram of a wireless communication network 1500, which is an alternate embodiment of wireless communication network 200 (FIG. 2) further including a Wi-Fi wireless base station 1530, as well as a wireless repeater 1504 in place of wireless repeater 204. Wireless repeater 1504 is like wireless repeater 204 except that wireless repeater 1504 is further configured to forward wireless data to and from Wi-Fi wireless access base station 1530. For example, in some embodiments, second wireless device 108 is configured to operate according to both of a 3GPP communication protocol and a Wi-Fi communication protocol, and second wireless device 108 is connected to Wi-Fi wireless base station 1530 via wireless communication beam 128, wireless repeater 1504, and a wireless communication beam 1532.

Figure 16:
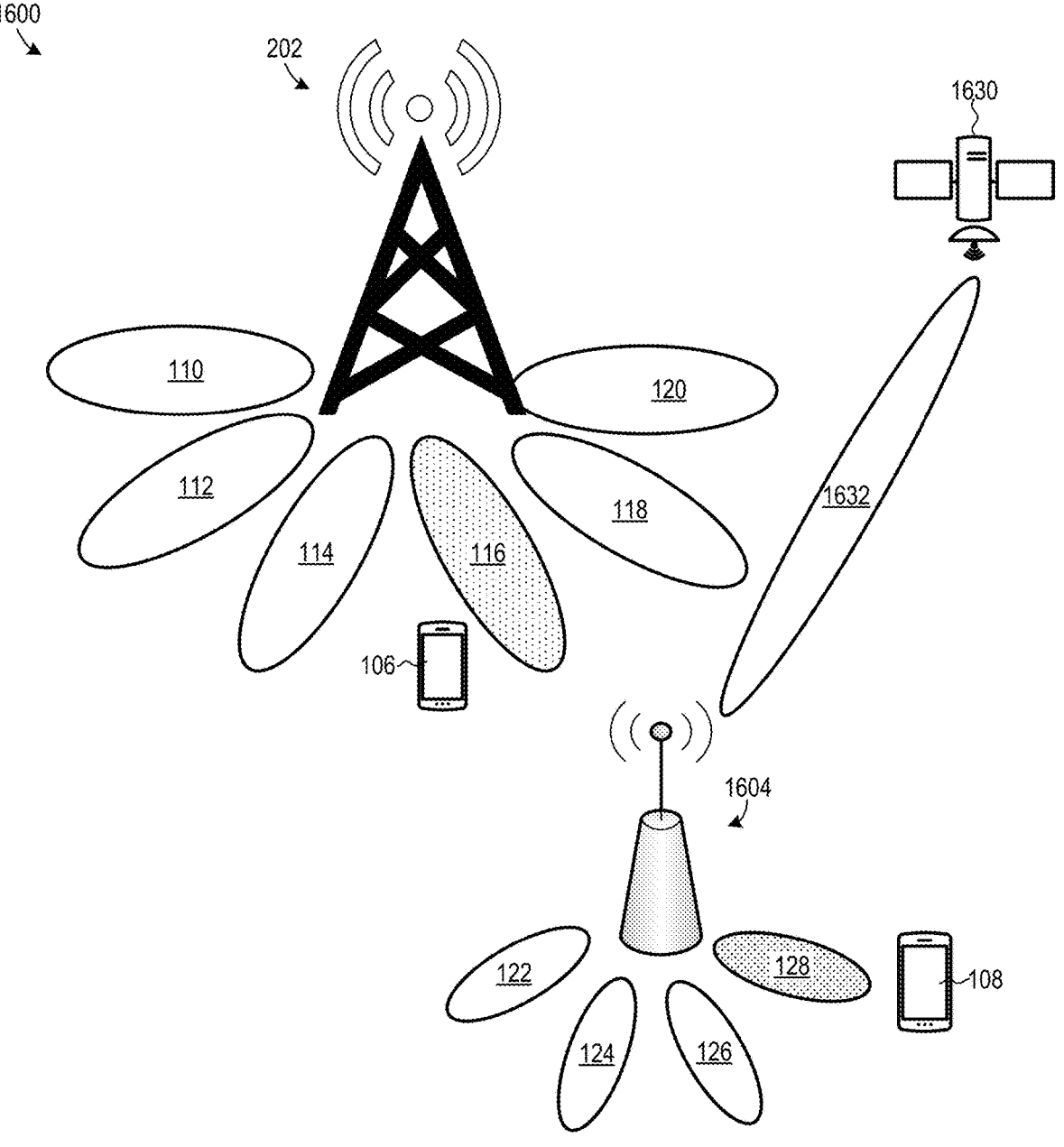
FIG. 16 is a block diagram of an alternate embodiment of the FIG. 2 wireless communication network further including a wireless communication satellite.

As another example, FIG. 16 is a block diagram of a wireless communication network 1600, which is an alternate embodiment of wireless communication network 200 (FIG. 2) further including a wireless communication satellite 1630, as well as a wireless repeater 1604 in place of wireless repeater 204. Wireless communication satellite 1630 is, for example, a VLEO satellite, a LEO satellite, a MEO satellite, or a GEO satellite. Wireless repeater 1604 is like wireless repeater 204 except that wireless repeater 1604 is further configured to forward wireless data to and from wireless communication satellite 1630. For example, in some embodiments, second wireless device 108 is configured to operate according to both of a 3GPP communication protocol and a satellite communication protocol, and second wireless device 108 is connected to wireless communication satellite 1630 via wireless communication beam 128, wireless repeater 1604, and a wireless communication beam 1632.

Additional Embodiments

By way of example and not of limitation, the following are additional embodiments of the new systems and methods for initial access in a communication network including a wireless repeater.

Figure 17:
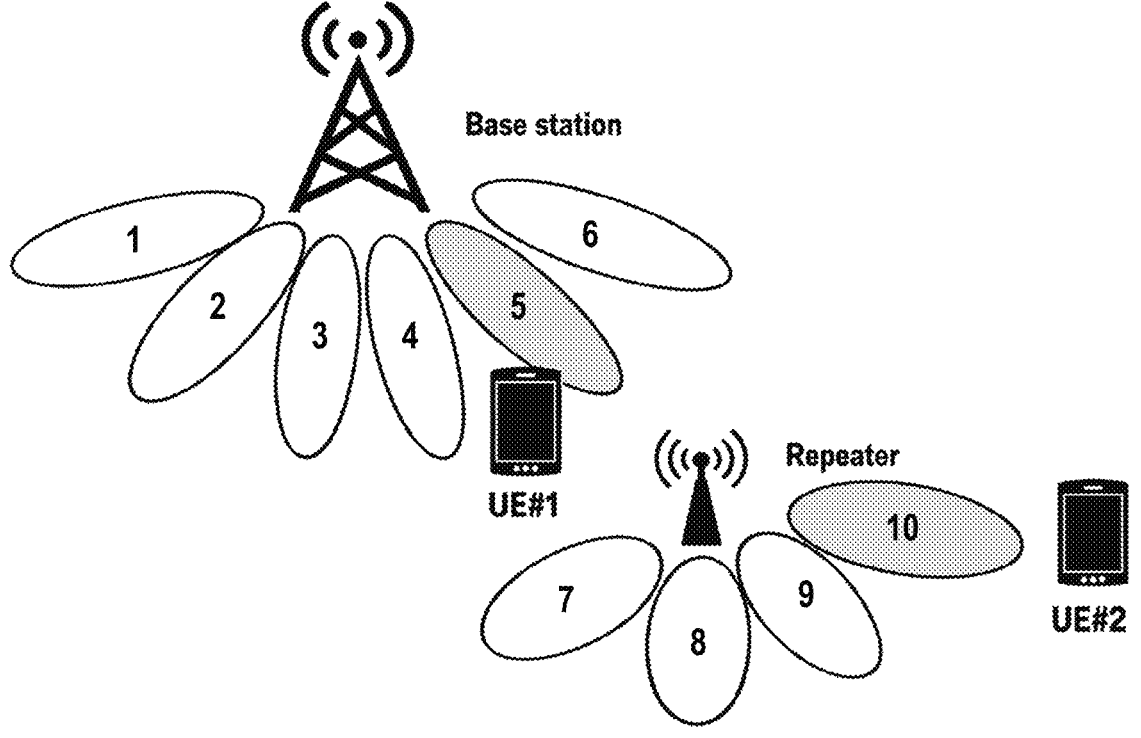
FIG. 17 is a block diagram illustrating a multi-beam scenario with a repeater.

When a wireless base station employs one or more repeaters for coverage expansion as shown in FIG. 17 (e.g., a repeater for coverage expansion for UE #2), a set of analog beams operated by a wireless base station and a set of analog beams operated by a wireless repeater may be different. The wireless repeater may operate multiple beams to effectively expand coverage to various UEs (or other wireless devices).

UE #1 as well as UE #2 are transparent from a presence of the wireless repeater. In other words, UE #2 performs an initial access procedure based on a legacy procedure. As UE #2 initiates a random access procedure based on a best beam/SSB determined via cell selection/measurements, unless the initial access procedure is not supported via the wireless repeater, the repeater needs to transmit SSB(s).

Initial access support with a repeater may be extended, for example, according to one of the following options:

Option 1. Keeping SSBs of a wireless base station with simple forwarding: SSBs associated with a set of beams of the wireless base station are transmitted, in the same manner as if the wireless base station was not operating with a wireless repeater, and the wireless repeater receives each SSB based on a best beam (e.g., beam #5 in FIG. 17) and transmit the SSB based on configured/determine beam pattern/configuration.

Figure 18:
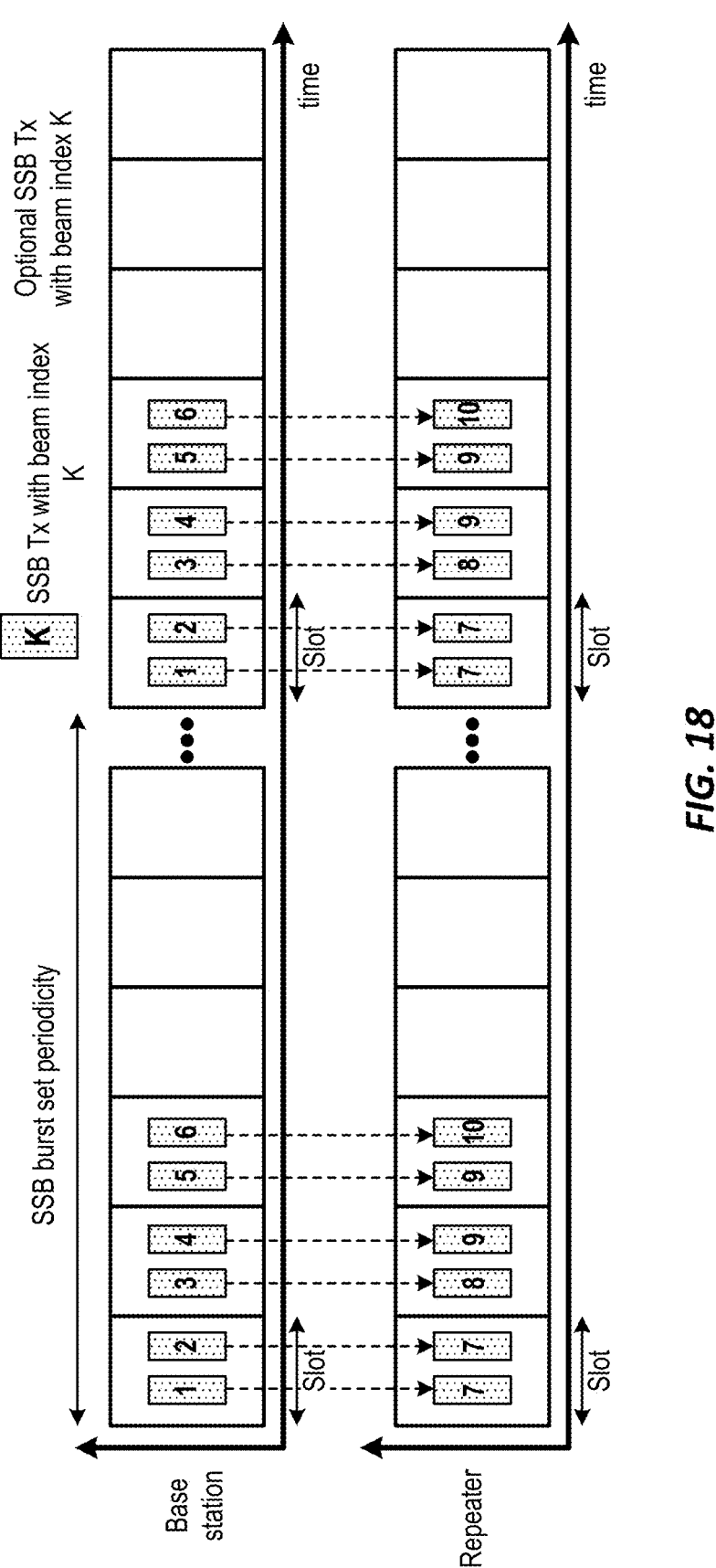
FIG. 18 includes two graphs illustrating one example of initial access resource configuration where synchronization signal blocks of wireless base station are forwarded by a wireless repeater, according to an embodiment.

FIG. 18 shows an example where the wireless repeater may receive each SSB (e.g., SSB with index #1, . . . , #6) and forward using beam #7, . . . , #10 (e.g., beam #7 for SSB index #1, beam #8 for SSB index #3, and so on). The wireless base station may configure a beam pattern of SSB forwarding or beam configuration in each slot and/or resource via a side control information (e.g., RRC signaling or DCI signaling).

Option 2. Additional SSBs for each wireless repeater of a wireless base station: a wireless base station allocates resources for additional SSB(s) for a wireless repeater, and also allocates additional SSB index(es) for the additional SSB(s). For example, when the wireless repeater has four beams as shown in FIG. 17, the wireless base station allocates four additional SSB indexes and resources for the additional SSB indexes.

Figure 19:
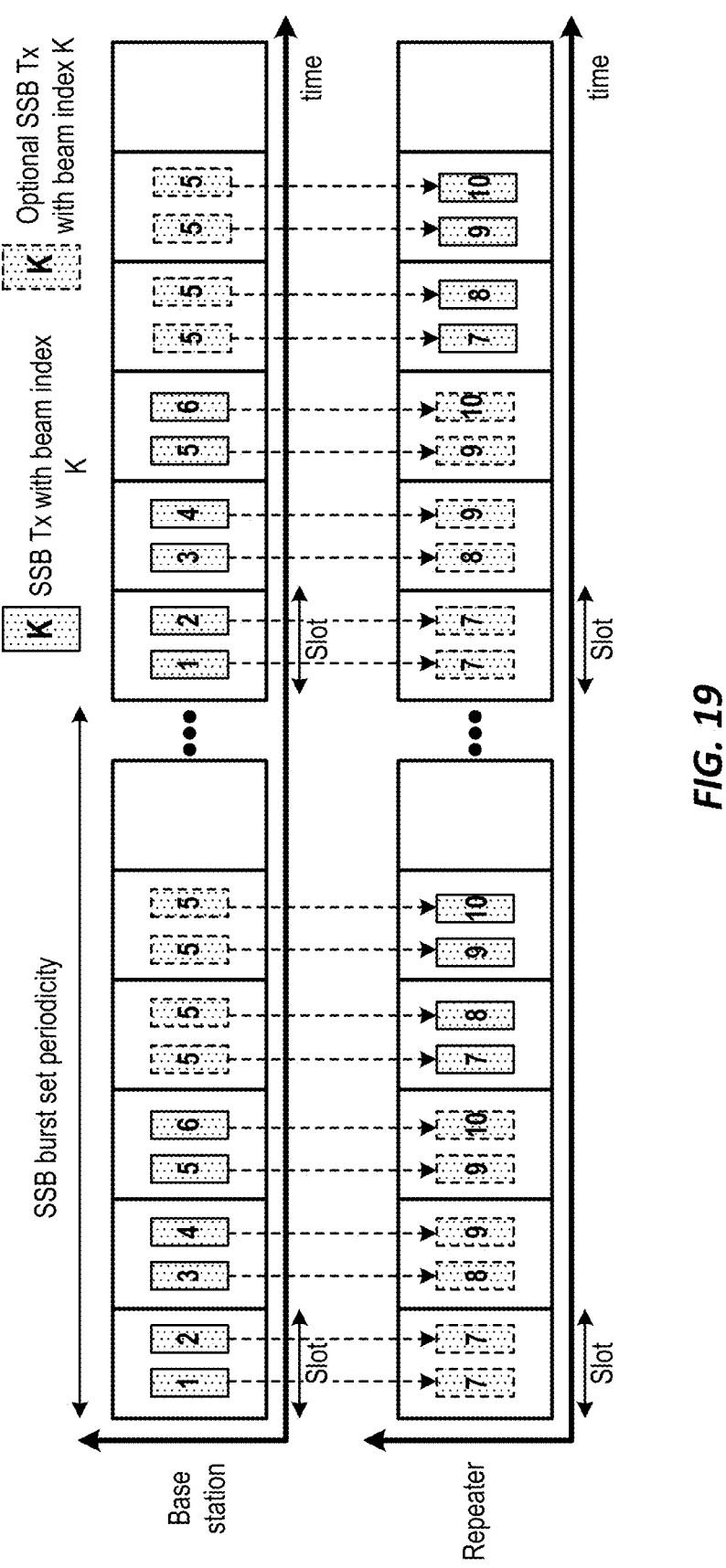
FIG. 19 includes two graphs illustrating one example of initial access resource configuration where a wireless base station allocates additional synchronization signal blocks for a wireless repeater, according to an embodiment.

FIG. 19 illustrates an example of additional SSBs. For example, the wireless base station transmits SSBs with index 1 to 6 corresponding to beam #1, . . . #6. The wireless base station allocates additional SSB resources for SSB index #7, . . . , #10 corresponding to beam #7, #10 of the wireless repeater. The wireless base station may or may not transmit SSB via the additional SSB resources. When the wireless base station transmits the SSB via the additional SSB resources, the wireless base station may transmit the SSB based on the best beam of the wireless repeater (e.g., beam #5) so that the wireless repeater would receive the SSB with higher quality. The wireless repeater may or may not forward received SSBs corresponding to index #1 to #6 based on the configuration by the wireless base station. The wireless base station may disable forwarding and/or receiving of such resources to avoid any misleading forwarding by the repeater.

When Option 2 is used for the wireless repeater, to minimize resource overhead, further consideration not to transmit SSBs by the wireless base station via additional resources for the wireless repeater where the wireless repeater may repeat a SSB received via the best beam in the SSB burst set periodicity would be possible.

Figure 20:
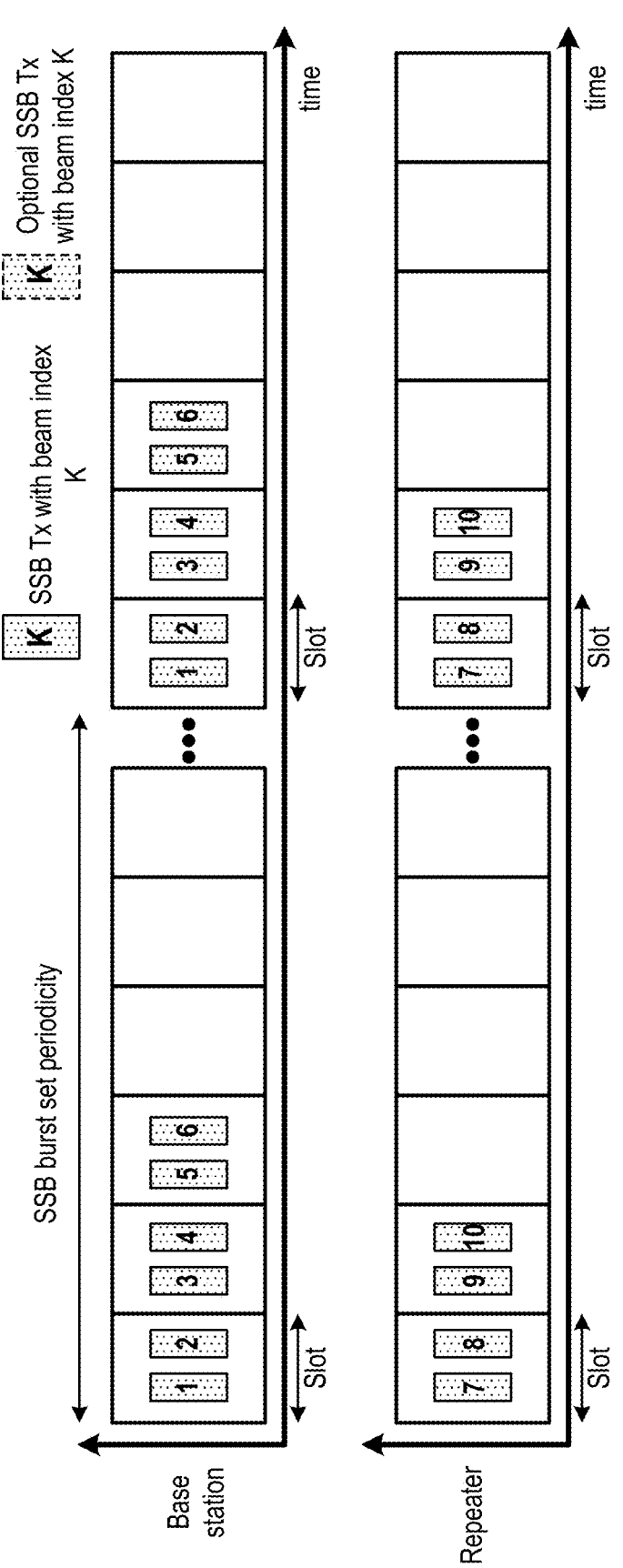
FIG. 20 includes two graphs illustrating one example of initial access resource configuration where a wireless repeater stores and forward initial access resources.

Option 3. Store-and-forward SSBs by the wireless repeater: as a SSB may be repeated via beam-sweeped transmission in each SSB burst set periodicity, a wireless base station transmits SSB via side control information and the wireless repeater may forward the SSB via one or more SSB resources configured by the wireless base station. FIG. 20 illustrates one example of initial access resources with Option 3.

For example, before each SSB burst set, the wireless base station transmits a SSB content to the wireless repeater. The wireless repeater would transmit the received SSB content via one or more SSB resources in the next SSB burst set. To support this option, the wireless repeater may need to transmit data buffered in a buffer.

Each Option has drawbacks and benefits. For example, the following Table 2 captures high level drawbacks and benefits.

TABLE 2

| | Benefits | Drawbacks | Specification Impact |
|---|---|---|---|
| Option 1: simple forwarding | Complexity is low as the wireless repeater transmits a received signal based on a configured/indicated beam | Quality of a received SSB based on a non-best beam may not be good, and thus the quality of an | Beam pattern/information on SSB resources and/or downlink |

TABLE 2-continued

| | Benefits | Drawbacks | Specification Impact |
|---|---|---|---|
| | configuration, no specific handling is needed for a SSB or initial access | amplified/forwarded SSB may not be good. Furthermore, when a wireless device supported by the wireless repeater transmits a preamble, there could be ambiguity between the preamble from the wireless device and other preambles transmitted by other wireless devices directly supported by the wireless base station. As a transmitter beam of the wireless repeater, in a same SSB resource, is different from a transmitter beam of the wireless base station, reception quality in preamble may be undesirable as well due to mismatch/misalignment. | resources may be needed. Separate preamble resources may be necessary that are used by the wireless repeater to forward preamble resources. |
| Option 2: additional SSBs | Simple management/extension of initial access for wireless devices serviced by a wireless repeater | May not be scalable with a number of beams of a wireless repeater and/or a number of repeaters of a wireless base station. Additional resources are needed just for supporting a wireless repeater. With a limited maximum number of SSBs supported in each frequency region, this option may lead to practical deployment scenario limitation. | Slot format indicator configurations to indicate resources for receiving/forwarding from/to a wireless base station or receiving/forwarding from/to a wireless device(s). |
| Option 3: store-and-forward | Scalable and resource efficient. | Complexity of the wireless repeater increases. Management of the wireless repeater becomes more complicated. Unless random access resources are allocated separately for beams/SSBs of the wireless repeaters, some ambiguity as in Option 1 may also be present. | Side information on data to be stored, and SSB indexes for the wireless repeater. Slot format indicator configurations to indicate resources for receiving/forwarding from/to wireless base station or not-receiving/forwarding stored data or receiving/forwarding from/to wireless device(s). |

When a wireless device accesses a wireless base station via a wireless repeater in a multi-beam scenario, the wireless base station needs to differentiate the wireless device from other wireless devices directly connecting to the base station. For example, the wireless device TCI state/spatial domain filter parameter may be different from that of another wireless device even though the wireless repeater and the another wireless device may have selected a SSB as a best beam. With no impact on the wireless device, the wireless base station may acquire this information via the wireless repeater or via configuration. For example, when Option 2 is used for initial access, the wireless base station may acquire a wireless repeater and a wireless device via the wireless repeater based on a preamble reception on a SSB index assigned to the wireless repeater.

Thus, regardless of whether the wireless repeater operates multiple beams or not, it would be beneficial to allocate additional SSBs for the wireless repeater so that the wireless base station acquires/identifies wireless device(s) serviced by the wireless repeater via the initial access procedure. To support this, a side control information of the wireless repeater would include necessary information based on which option is used for the initial access. For example, when Option 2 is used, one or more SSB index(s) used for the wireless repeater are signaled. For example, when Option 1 or 3 is used, dedicated preamble resources for the wireless repeater are signaled.

When a wireless repeater simply forwards all received data all the time (e.g., receive-forward from a wireless base station to wireless device(s) in a downlink slot and receive-forward from wireless device(s) to a wireless base station), depending on the situation, this may increase interference to the wireless device(s) or the wireless base station or may lead ambiguous situations. For example, when the wireless repeater forwards a SSB with a beam K to a wireless device, the wireless device may receive the SSB from the wireless base station and the wireless repeater. The wireless device may determine a receiver beam based on the combined signal which may not correspond to the beam K. This may lead to inaccurate spatial domain filter parameter of a preamble transmission form the wireless device, and may impact successive operations.

Similarly, when the wireless repeater forwards all received uplink data from wireless devices even though wireless devices are all supported by the wireless base station directly, forwarded signals may interfere with uplink reception at the wireless base station.

To avoid the aforementioned undesirable interference, it would be desirable to inform when to receive/forward to/from the wireless base station and/or wireless devices based on a slot format indicator.

Also, when side control information is sent to the wireless repeater, the wireless repeater is not supposed to forward the received side control information. To support this, at least one new slot format indicator to indicate resources where the wireless repeater receives from the wireless base station without forwarding may be necessary.

In an example, when the wireless repeater forwards a received SSB via a best beam in configured SSB indexes for the wireless repeater as shown in Option 2, downlink resources without forwarding would be also beneficial.

According to a slot format indicator which may be dynamically transmitted via a side control information, a wireless repeater may receive/forward from the wireless base station to wireless devices in downlink resources, may receive/forward from wireless devices to the wireless base station in uplink resources, may receive without forwarding from the wireless base station in downlink resources without forwarding, and may not receive nor forward in reserved resources.

Combinations of Features

Features described above may be combined in various ways without departing from the scope hereof. The following examples illustrate some possible combinations.

(A1) A method operable by a wireless repeater in a wireless communication network includes (1) receiving, from a wireless base station, first wireless communication beam information specifying operation of the wireless repeater with respect to one or more first time resources, the one or more first time resources overlapping with one or more first signal resources of the wireless base station, (2) receiving, from the wireless base station, second wireless communication beam information specifying operation of the wireless repeater with respect to one or more second time resources, the one or more second time resources overlapping with one or more second signal resources of the wireless base station, (3) determining, from the first wireless communication beam information, that wireless communication data received via the one or more first signal resources of the wireless base station should be forwarded, and (4) forwarding the wireless communication data received via the one or more first signal resources of the wireless base station to one or more wireless devices.

(A2) The method denoted as (A1) may further include determining, from the second wireless communication beam information, that wireless communication data received via the one or more second signal resources of the wireless base station should not be forwarded.

(A3) In any one of the methods denoted as (A1) and (A2), each of the one or more first signal resources of the wireless base station and the one or more second signal resources of the wireless base station may be at least partially used for initial access to the wireless communication network by one or more wireless devices.

(A4) In any one of the methods denoted as (A1) through (A3), (1) the one or more first signal resources of the wireless base station may include one or more of a first synchronization signal block (SSB), a first channel state information reference signal (CSI-RS), and first downlink control information, and (2) the one or more second signal resources of the wireless base station may include one or more of a second SSB, a second CSI-RS, and first downlink control information.

(A5) Any one of the methods denoted as (A1) through (A4) may further include selectively forwarding initial access preambles received from wireless devices to the wireless base station.

(A6) Any one of the methods denoted as (A1) through (A5) may further include receiving dedicated initial access resources for the wireless repeater.

(A7) In any one of the methods denoted as (A1) through (A6), the wireless repeater may be configured to receive and forward wireless communication data adhering to a Third Generation Partnership (3GPP) communication protocol.

(A8) Any one of the methods denoted as (A1) through (A7) may further include (1) receiving first wireless communication data from the wireless base station and (2) forwarding the first wireless communication data to one or more wireless devices without processing the first wireless communication data.

(B1) A method operable by a wireless repeater in a wireless communication network includes (1) receiving, from a wireless bases station, first wireless communication beam information specifying operation of the wireless repeater with respect to one or more first time resources, the one or more first time resources overlapping with one or more first uplink signal resources of the wireless base station, (2) receiving, from the wireless base station, second wireless communication beam information specifying operation of the wireless repeater with respect to one or more second time resources, the one or more second time resources overlapping with one or more second uplink signal resources of the wireless base station, (3) determining, from the first wireless communication beam information, that wireless communication data received from one or more wireless devices via the one or more first uplink signal resources of the wireless base station should be forwarded, and (4) forwarding the wireless communication data received from the one or more wireless devices via the one or more first uplink resources of the wireless base station to the wireless base station.

(B2) The method denoted as (B1) may further include determining, from the second wireless communication beam information, that wireless communication data received via the one or more second uplink signal resources of the wireless base station should not be forwarded.

(B3) In any one of the methods denoted as (B1) and (B2), each of the one or more first uplink signal resources of the wireless base station and the one or more second uplink signal resources of the wireless base station may be at least partially used for initial access to the wireless communication network by one or more wireless devices.

(B4) In any one of the methods denoted as (B1) through (B3), (1) the first uplink signal resources of the wireless base station may include one or more of first preamble resources and first configured grant resources, and (2) the second uplink signal resources of the wireless base station may include one or more of second preamble resources and second configured grant resources.

(B5) Any one of the methods denoted as (B1) through (B4) may further include selectively forwarding initial access preambles received from wireless devices to the wireless base station.

(B6) Any one of the methods denoted as (B1) through (B5) may further include receiving dedicated initial access resources for the wireless repeater.

(B7) In any one of the methods denoted as (B1) through (B6), the wireless repeater may be configured to receive and forward wireless communication data adhering to a Third Generation Partnership (3GPP) communication protocol.

(B8) Any one of the methods denoted as (B1) through (B7) may further include (1) receiving first wireless communication data from the wireless base station and (2) forwarding the first wireless communication data to one or more wireless devices without processing the first wireless communication data.

(C1) A method operable by a wireless repeater in a wireless communication network includes (1) receiving one or more first dynamic slot format indicators from a wireless base station, (2) receiving first wireless communication data from the wireless base station, (3) determining, from the one or more first dynamic slot format indicators, that the first wireless communication data is to be forwarded, and (4) forwarding the first wireless communication data to one or more wireless communication nodes.

(C2) The method denoted as (C1) may further include (1) receiving one or more second dynamic slot format indicators from the wireless base station, (2) receiving second wireless communication data from the wireless base station, (3) determining, from the one or more second dynamic slot format indicators, that the second wireless communication data is to be stored, and (4) storing the second wireless communication data.

(C3) In any one of the methods denoted as (C1) and (C2), the first wireless communication data may include one or more synchronization signal blocks.

(C4) In any one of the methods denoted as (C1) through (C3), the wireless repeater may be configured to receive and forward wireless communication data adhering to a Third Generation Partnership (3GPP) communication protocol.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method operable by a wireless repeater in a wireless communication network, the method comprising:

receiving, from a wireless base station, first wireless communication beam information specifying operation of the wireless repeater with respect to one or more first time resources, the one or more first time resources overlapping with one or more first signal resources of the wireless base station;

receiving, from the wireless base station, second wireless communication beam information specifying operation of the wireless repeater with respect to one or more second time resources, the one or more second time resources overlapping with one or more second signal resources of the wireless base station;

determining, from the first wireless communication beam information, that wireless communication data received via the one or more first signal resources of the wireless base station should be forwarded; and forwarding the wireless communication data received via the one or more first signal resources of the wireless base station to one or more wireless devices, wherein each of the one or more first signal resources of the wireless base station and the one or more second signal resources of the wireless base station is at least partially used for initial access to the wireless communication network by one or more wireless devices.

2. A method operable by a wireless repeater in a wireless communication network, the method comprising:

receiving, from a wireless base station, first wireless communication beam information specifying operation of the wireless repeater with respect to one or more first time resources, the one or more first time resources overlapping with one or more first signal resources of the wireless base station;

receiving, from the wireless base station, second wireless communication beam information specifying operation of the wireless repeater with respect to one or more second time resources, the one or more second time resources overlapping with one or more second signal resources of the wireless base station;

determining, from the first wireless communication beam information, that wireless communication data received via the one or more first signal resources of the wireless base station should be forwarded;

forwarding the wireless communication data received via the one or more first signal resources of the wireless base station to one or more wireless devices; and determining, from the second wireless communication beam information, that wireless communication data received via the one or more second signal resources of the wireless base station should not be forwarded.

3. The method of claim 1, wherein:

the one or more first signal resources of the wireless base station include one or more of a first synchronization signal block (SSB), a first channel state information reference signal (CSI-RS), and first downlink control information; and the one or more second signal resources of the wireless base station include one or more of a second SSB, a second CSI-RS, and second downlink control information.

4. The method of claim 1, further comprising selectively forwarding initial access preambles received from wireless devices to the wireless base station.

5. The method of claim 1, further comprising receiving dedicated initial access resources for the wireless repeater.

6. The method of claim 1, wherein the wireless repeater is configured to receive and forward wireless communication data adhering to a Third Generation Partnership (3GPP) communication protocol.

7. The method of claim 1, further comprising:

receiving first wireless communication data from the wireless base station; and forwarding the first wireless communication data to one or more wireless devices without processing the first wireless communication data.

8. A method operable by a wireless repeater in a wireless communication network, the method comprising:

receiving, from a wireless base station, first wireless communication beam information specifying operation of the wireless repeater with respect to one or more first time resources, the one or more first time resources overlapping with one or more first uplink signal resources of the wireless base station;

receiving, from the wireless base station, second wireless communication beam information specifying operation of the wireless repeater with respect to one or more second time resources, the one or more second time resources overlapping with one or more second uplink signal resources of the wireless base station;

determining, from the first wireless communication beam information, that wireless communication data received from one or more wireless devices via the one or more first uplink signal resources of the wireless base station should be forwarded; and forwarding the wireless communication data received from the one or more wireless devices via the one or more first uplink resources of the wireless base station to the wireless base station, wherein each of the one or more first uplink signal resources of the wireless base station and the one or more second uplink signal resources of the wireless base station is at least partially used for initial access to the wireless communication network by one or more wireless devices.

9. A method operable by a wireless repeater in a wireless communication network, the method comprising:

receiving, from a wireless base station, first wireless communication beam information specifying operation of the wireless repeater with respect to one or more first time resources, the one or more first time resources overlapping with one or more first uplink signal resources of the wireless base station;

receiving, from the wireless base station, second wireless communication beam information specifying operation of the wireless repeater with respect to one or more second time resources, the one or more second time resources overlapping with one or more second uplink signal resources of the wireless base station;

determining, from the first wireless communication beam information, that wireless communication data received from one or more wireless devices via the one or more first uplink signal resources of the wireless base station should be forwarded;

forwarding the wireless communication data received from the one or more wireless devices via the one or more first uplink resources of the wireless base station to the wireless base station; and determining, from the second wireless communication beam information, that wireless communication data received via the one or more second uplink signal resources of the wireless base station should not be forwarded.

10. A method operable by a wireless repeater in a wireless communication network, the method comprising:

receiving, from a wireless base station, first wireless communication beam information specifying operation of the wireless repeater with respect to one or more first time resources, the one or more first time resources overlapping with one or more first uplink signal resources of the wireless base station;

receiving, from the wireless base station, second wireless communication beam information specifying operation of the wireless repeater with respect to one or more second time resources, the one or more second time resources overlapping with one or more second uplink signal resources of the wireless base station;

determining, from the first wireless communication beam information, that wireless communication data received from one or more wireless devices via the one or more first uplink signal resources of the wireless base station should be forwarded; and forwarding the wireless communication data received from the one or more wireless devices via the one or more first uplink resources of the wireless base station to the wireless base station;

wherein:

the one or more first uplink signal resources of the wireless base station comprise one or more of first preamble resources and first configured grant resources, and the one or more second uplink signal resources of the wireless base station comprise one or more of second preamble resources and second configured grant resources.

11. The method of claim 8, further comprising selectively forwarding initial access preambles received from wireless devices to the wireless base station.

12. The method of claim 8, further comprising receiving dedicated initial access resources for the wireless repeater.

13. The method of claim 8, wherein the wireless repeater is configured to receive and forward wireless communication data adhering to a Third Generation Partnership (3GPP) communication protocol.

14. The method of claim 8, further comprising:

receiving first wireless communication data from the wireless base station; and forwarding the first wireless communication data to one or more wireless devices without processing the first wireless communication data.

15. A method operable by a wireless repeater in a wireless communication network, the method comprising:

receiving one or more first dynamic slot format indicators from a wireless base station;

receiving first wireless communication data from the wireless base station;

determining, from the one or more first dynamic slot format indicators, that the first wireless communication data is to be forwarded;

forwarding the first wireless communication data to one or more wireless communication nodes;

receiving one or more second dynamic slot format indicators from the wireless base station;

receiving second wireless communication data from the wireless base station;

determining, from the one or more second dynamic slot format indicators, that the second wireless communication data is to be stored; and storing the second wireless communication data.

16. The method of claim 15, wherein the first wireless communication data includes one or more synchronization signal blocks.

17. The method of claim 15, wherein the wireless repeater is configured to receive and forward wireless communication data adhering to a Third Generation Partnership (3GPP) communication protocol.

* * * * *